(12) United States Patent
Lee et al.

(10) Patent No.: US 11,763,852 B2
(45) Date of Patent: Sep. 19, 2023

(54) BRANCHING LOGIC IN A PLAYBACK ENVIRONMENT

(71) Applicant: Netflix, Inc., Los Gatos, CA (US)

(72) Inventors: Kevin Pei-Wen Lee, San Jose, CA (US); Lawrence E. Jones, San Mateo, CA (US); Joseph Peyton Lea, IV, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 18 days.

(21) Appl. No.: 17/454,964

(22) Filed: Nov. 15, 2021

(65) Prior Publication Data

US 2022/0093134 A1 Mar. 24, 2022

Related U.S. Application Data

(63) Continuation of application No. 16/777,864, filed on Jan. 30, 2020, now Pat. No. 11,217,280.
(Continued)

(51) Int. Cl.
*G11B 27/10* (2006.01)
*H04N 21/472* (2011.01)
*G06F 16/44* (2019.01)

(52) U.S. Cl.
CPC ............. *G11B 27/10* (2013.01); *G06F 16/44* (2019.01); *H04N 21/47217* (2013.01)

(58) Field of Classification Search
CPC ... G11B 27/10; G06F 16/44; H04N 21/47217; H04N 21/8541
(Continued)

(56) References Cited

U.S. PATENT DOCUMENTS

2006/0064733 A1 3/2006 Norton et al.
2010/0131335 A1 5/2010 Roh et al.
(Continued)

FOREIGN PATENT DOCUMENTS

BR 112021001411-0 A2 4/2021
BR 112021001524-8 A2 4/2021
(Continued)

OTHER PUBLICATIONS

International Search Report and Written Opinion received for PCT Application Serial No. PCT/US2020/015979 dated Apr. 7, 2020, 12 pages.
(Continued)

*Primary Examiner* — Loi H Tran
(74) *Attorney, Agent, or Firm* — Greenberg Traurig, LLP

(57) ABSTRACT

The disclosed computer-implemented method may include accessing a pre-rendered multimedia item. The pre-rendered multimedia item may have branching logic associated with it, where the branching logic includes branching points that direct non-sequential playback of the pre-rendered multimedia item. The method may also include initializing playback of the pre-rendered multimedia item and accessing, at the branching points, various trigger conditions that direct playback order of different segments of the pre-rendered multimedia item. The method may then include updating, based on the trigger conditions, at least some portion of custom state data. The method may further include playing back the segments of the pre-rendered multimedia item according to the updated state data. Various other methods, systems, and computer-readable media are also disclosed.

20 Claims, 9 Drawing Sheets

Related U.S. Application Data

(60) Provisional application No. 62/909,597, filed on Oct. 2, 2019, provisional application No. 62/799,007, filed on Jan. 30, 2019.

(58) Field of Classification Search
USPC .......................................................... 386/241
See application file for complete search history.

(56) References Cited

U.S. PATENT DOCUMENTS

| | | | |
|---|---|---|---|
| 2011/0194839 A1 | 8/2011 | Gebert et al. | |
| 2011/0202562 A1 | 8/2011 | Bloch et al. | |
| 2013/0094830 A1* | 4/2013 | Stone | H04N 5/775 386/230 |
| 2013/0254282 A1* | 9/2013 | Joy | G06F 16/435 709/204 |
| 2015/0156557 A1 | 6/2015 | Kang et al. | |
| 2016/0353145 A1* | 12/2016 | Ahlm | H04N 21/27 |
| 2016/0373795 A1 | 12/2016 | Stefanoski et al. | |
| 2017/0257671 A1* | 9/2017 | Yerli | H04N 21/4668 |
| 2017/0310723 A1 | 10/2017 | Furtwangler | |
| 2018/0008894 A1 | 1/2018 | Sack | |
| 2020/0037047 A1 | 1/2020 | Cheung et al. | |
| 2020/0037048 A1 | 1/2020 | Cheung et al. | |
| 2020/0243116 A1 | 7/2020 | Lee et al. | |

FOREIGN PATENT DOCUMENTS

| | | |
|---|---|---|
| CA | 3 106 825 A1 | 1/2020 |
| CA | 3 106 982 A1 | 1/2020 |
| CA | 3 102 150 A1 | 8/2020 |
| EP | 2 712 206 A1 | 3/2014 |
| WO | 2006/039196 A2 | 4/2006 |
| WO | 2020/023315 A1 | 1/2020 |
| WO | 2020/023730 A1 | 1/2020 |
| WO | 2020/160341 A1 | 8/2020 |

OTHER PUBLICATIONS

Non-Final Office Action received for U.S. Patent Application Serial No. 16/777,864 dated Jul. 9, 2020, 31 pages.
Final Office Action received for U.S. Appl. No. 16/777,864 dated Dec. 9, 2020, 24 pages.
Notice of Allowance received for U.S. Appl. No. 16/048,174 dated Jan. 13, 2021, 7 pages.
Final Office Action received for U.S. Appl. No. 16/048,171 dated Mar. 1, 2021, 21 pages.
Notice of Allowance received for U.S. Appl. No. 16/048,174 dated Apr. 7, 2021, 8 pages.
Advisory Action received for U.S. Appl. No. 16/048,171 dated Aug. 11, 2020, 9 pages.
Advisory Action received for U.S. Appl. No. 16/048,171 dated May 25, 2021, 8 pages.
Final Office Action received for U.S. Appl. No. 16/048,171 dated Apr. 30, 2020, 25 pages.
Non-Final Office Action received for U.S. Appl. No. 16/048,171 dated Sep. 18, 2020, 17 pages.
Non-Final Office Action received for U.S. Appl. No. 16/048,171 dated Apr. 5, 2019, 11 pages.
Non-Final Office Action received for U.S. Appl. No. 16/048,171 dated Oct. 21, 2019, 13 pages.
International Search Report and Written Opinion received for PCT Application Serial No. PCT/US2019/042655 dated Sep. 13, 2019, 13 pages.
Final Office Action received for U.S. Appl. No. 16/048,174 dated Sep. 24, 2020, 11 pages.
Non-Final Office Action received for U.S. Appl. No. 16/048,174 dated Mar. 30, 2020, 22 pages.
International Search Report and Written Opinion received for PCT Application Serial No. PCT/US2019/043407 dated Oct. 30, 2019, 14 pages.
Krishnamoorthi et al., "Empowering the Creative User: Personalized HTTP-based Adaptive Streaming of Multi-path Nonlinear Video", Future Human-Centric Multimedia Networking, ACM, Aug. 16, 2013, pp. 53-58.
Krishnamoorthi et al., "Quality-adaptive Prefetching for Interactive Branched Video using HTTP-based Adaptive Streaming", Multimedia, ACM, Nov. 3, 2014, pp. 317-326.
Cragun et al., "Improved Multimedia Response using Neural Net Prediction", IBM, Technical Disclosure Bulletin, vol. 37, No. 10, Oct. 1994, 3 pages.
Non-Final Office Action received for U.S. Appl. No. 16/777,864 dated Mar. 18, 2021, 23 pages.
Non Final Office Action received for U.S. Appl. No. 16/777,864 dated Sep. 2, 2021, 29 pages.
Notice of Allowance received for U.S. Appl. No. 16/777,864 dated Jun. 11, 2021, 22 pages.
Notice of Allowance received for U.S. Appl. No. 16/777,864 dated Oct. 7, 2021, 28 pages.
Examination report No. 1 received for Australian Patent Application Serial No. 2019310340 dated Aug. 9, 2021, 3 pages.
International Preliminary Report on Patentability received for PCT Application Serial No. PCT/US2020/015979 dated Aug. 12, 2021, 10 pages.
Notice of Allowance received for U.S. Appl. No. 16/048,174 dated Aug. 6, 2021, 9 pages.
International Preliminary Report on Patentability received for PCT Application Serial No. PCT/US2019/043407 dated Feb. 11, 2021, 9 pages.
International Preliminary Report on Patentability received for PCT Application Serial No. PCT/US2019/042655 dated Feb. 11, 2021, 7 pages.
Examination report No. 1 received for Australian Patent Application Serial No. 2019312280 dated Sep. 8, 2021, 3 pages.
Non-Final Office Action dated Sep. 6, 2022 in corresponding application No. 17/514,573.
Krishnoamoorthi, et al. Empowering the creative user: personalized HTTP-based adaptive streaming of multi-path nonlinear video. In Proceedings of the 2013 ACM SIGCOMM workshop on Future human-centric multimedia networking Aug. 16, 2013 (pp. 53-58).
Canadian Office Action dated Nov. 25, 2022 in corresponding CA application No. 3,106,825.
Canadian Office Action dated Nov. 25, 2022 in corresponding CA application No. 3,106,982.
Office Action received for Canadian Patent Application Serial No. 3,106,825 dated Jan. 28, 2022, 7 pages.
Office Action received for Canadian Patent Application Serial No. 3,106,982 dated Jan. 31, 2022, 7 pages.
Non-Final Office Action dated Jan. 20, 2023 in related U.S. Appl. No. 17/524,731.
Notice of Allowance dated Feb. 16, 2023 in related U.S. Appl. No. 17/514,573.

* cited by examiner

BRANCHING LOGIC IN A PLAYBACK ENVIRONMENT

CROSS REFERENCE TO RELATED APPLICATION

This application is a continuation of U.S. application Ser. No. 16/777,864, filed Jan. 30, 2020, which claims the benefit of U.S. Provisional Application No. 62/909,597, filed Oct. 2, 2019, and to U.S. Provisional Application No. 62/799,007, filed Jan. 30, 2019, the disclosures of each of which are incorporated, in their entirety, by this reference.

BACKGROUND

Multimedia content such as movies and television shows are typically recorded and stored in a video file. That video file includes many different scenes or other logical segments (e.g., chapters) that are stored in a particular order. Movies and tv shows, for example, are stored as a sequential set of scenes with an opening scene, one or more intermediate scenes, and a closing scene. Each of these scenes is played sequentially, one after the other, for the viewer. Other multimedia content such as video games may include different paths that can be taken by a user. As such, those paths may not necessarily follow a specified order as seen in a movie or television show. These paths of a video game, however, are typically rendered on the fly by the personal computer or other electronic device being used by the player.

Because movies and tv shows are pre-rendered, their scenes cannot be rendered on the fly. Rather, their scenes are played from the sequentially-ordered video file. If a content creator wanted to create an interactive experience in which the viewer interacted with the movie and choose various paths through the movie, the movie would need to be played back in a non-sequential order. Playing back the movie scenes in a non-sequential order without rendering the scenes on the fly may present a difficult problem.

SUMMARY

As will be described in greater detail below, the present disclosure describes methods and systems for playing back pre-rendered multimedia items according to branching logic.

In one example, a computer-implemented method for playing back a pre-rendered multimedia item according to branching logic may include accessing a pre-rendered multimedia item. The pre-rendered multimedia item may have branching logic associated with it, where the branching logic includes branching points that direct non-sequential playback of the pre-rendered multimedia item. The method may also include initializing playback of the pre-rendered multimedia item and accessing, at the branching points, various trigger conditions that direct playback order of different segments of the pre-rendered multimedia item. The method may then include updating, based on the trigger conditions, at least some portion of custom state data. The method may further include playing back the segments of the pre-rendered multimedia item according to the updated state data.

In some examples, the custom state data includes various primitives or complex objects. In some examples, at least one of the primitives or complex objects includes a precondition definition that specifies a precondition that is to occur before at least one of the branching points is triggered. In some examples, the precondition is executed at runtime to determine whether a branching point selection associated with the precondition is to be displayed during playback.

In some examples, the branching logic is streamed in a data stream, along with the pre-rendered multimedia item, to a content player for playback to a user. In some examples, at least one of the trigger conditions includes a user input received from a user. In some examples, at least one of the trigger conditions comprises a time-based trigger. In some examples, at least one of the trigger conditions is based on a state evaluation configured to evaluate a current condition of the custom state data.

In some examples, the custom state data is defined using one or more declarative statements. In some examples, the declarative statements are written using a domain specific language that is interpreted using a custom rules engine. In some examples, the custom state data stores branching point decisions from a current branch point or from previous branching points.

In addition, a corresponding system may include at least one physical processor and physical memory comprising computer-executable instructions that, when executed by the physical processor, cause the physical processor to access a pre-rendered multimedia item. The pre-rendered multimedia item may have branching logic associated with it, where the branching logic includes branching points that direct non-sequential playback of the pre-rendered multimedia item. The physical processor may also initialize playback of the pre-rendered multimedia item and access, at the branching points, various trigger conditions that direct playback order of different segments of the pre-rendered multimedia item. The physical processor may then update, based on the trigger conditions, at least some portion of custom state data associated with the branching points. The physical processor may further play back the segments of the pre-rendered multimedia item according to the updated state data In some examples, at least a portion of the custom state data is personalized to a specific user. In some examples, the precondition is executed at runtime to determine whether a branching point selection associated with the precondition is to be displayed during playback. In some examples, the specified branching logic for the accessed pre-rendered multimedia item is streamed to a client device along with the pre-rendered multimedia item.

In some examples, the branching logic is interpreted by a rules engine that applies branching logic to multiple different pre-rendered multimedia items. In some examples, the system further stores at least a portion of state data at a playback location of the pre-rendered multimedia item that is different than at a branching point. In some examples, the system further stores an accumulation of user selections and/or potentially previously accumulated custom user state as a snapshot in time, referred to herein as a save slot or a state snapshot. In some examples, the system resumes playback in a subsequent playback session of the pre-rendered multimedia item and restores the user's selections from the stored state snapshot.

In some examples, the above-described method may be encoded as computer-readable instructions on a computer-readable medium. For example, a computer-readable medium may include one or more computer-executable instructions that, when executed by at least one processor of a computing device, may cause the computing device to access a pre-rendered multimedia item. The pre-rendered multimedia item may have branching logic associated with it, where the branching logic includes branching points that direct non-sequential playback of the pre-rendered multimedia item. The computing device may also initialize playback of the pre-rendered multimedia item and access, at the branching points, various trigger conditions that direct playback order of different segments of the pre-rendered multimedia item. The computing device may then update, based on the trigger conditions, at least some portion of custom state data associated with the branching points. The computing device may further play back the segments of the pre-rendered multimedia item according to the updated state data.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
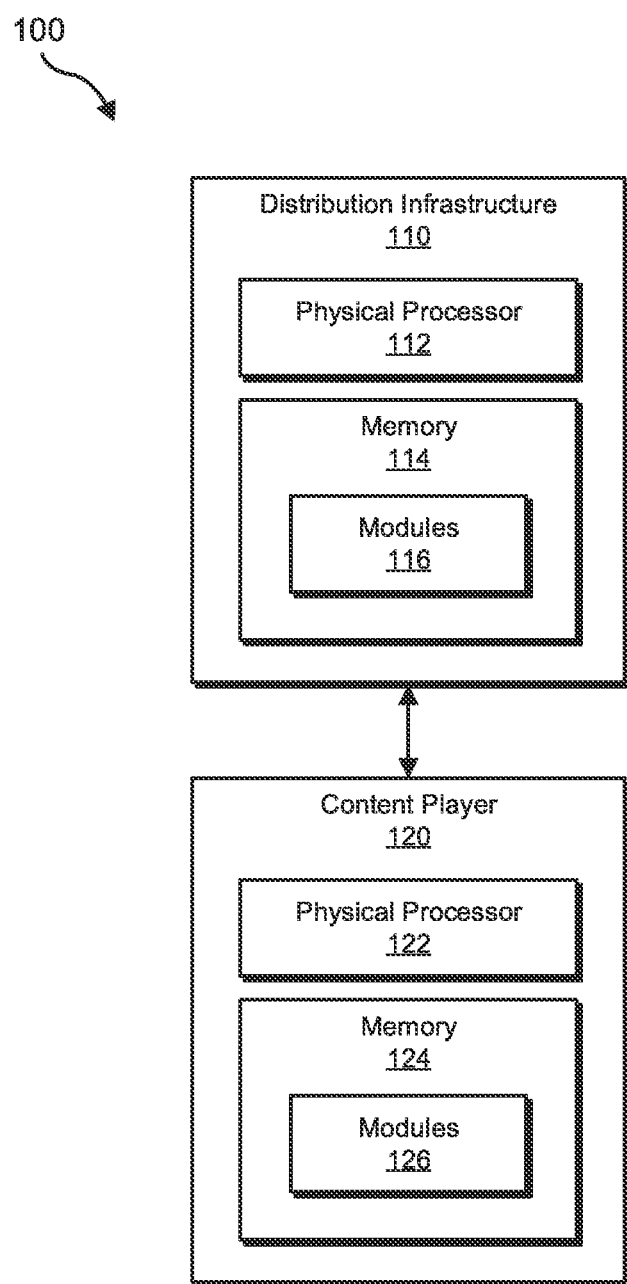
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to methods and systems for playing back pre-rendered multimedia items according to branching logic. This branch logic allows users to choose different paths through a pre-rendered multimedia item. In the past, systems that provided similar features allowing users to choose different paths through a media item were typically either part of a dynamically rendered video game, or provided branching logic that was hard-coded into a playback device. As noted above, when content providers create a movie, TV show, or other media content, that content is pre-rendered in a specific sequential order. Accordingly, each shot or segment is logically grouped and rendered one after another. As such, the final movie or tv show is rendered and stored as a sequential series of segments that are to be played back by a client device.

In a video game, on the other hand, scenes may be rendered on the fly on the user's PC or other electronic device. For instance, whether the video game is run locally or is streamed from a server, or whether the device is stationary or a cloud-based mobile device, the electronic device may render video game scenes as the user progresses through the game. The video game may allow the user to take many different paths through the game, but as each path is chosen, the graphics processing unit (GPU) of the electronic device begins to dynamically create the graphics associated with that path. In a pre-rendered video scenario, that type of dynamic creation is not possible. Moreover, in some video systems that allow users to select different paths through a portion of video content, the logic behind each branching decision (i.e., the point at which a user can choose a different path) was hard-coded into the playback device. And, moreover, that branching logic would only work for a single, specific piece of content (e.g., one movie). As such, there was no way for media content providers to provide different branching experiences for different media items, that was geared specifically to movies and tv items that had already been rendered in a sequential order.

At least some of the embodiments described herein provide a visual editing interface and a domain-specific language that allows users to apply a wide variety of branching logic possibilities to substantially any number of different tv shows, movies, or other media. The editing interface allows content creators to create the branching logic themselves, and allows for much more complex logic than simple binary "Yes or No" decisions. The branching logic may incorporate multiple different types of primitives, complex objects, logical operators (e.g., and, or, not, etc.), and complex functions, that allow use of items the user can carry over between media segments, and may provide custom user state that applies at some or all of the branching points. Ultimately, the editing interface and domain-specific language may provide a declarative method of defining branching logic for all types of media content. The media items may then be played back according to the branching logic. These concepts will be described in greater detail below with regard to FIGS. 1-11.

Figure 2:
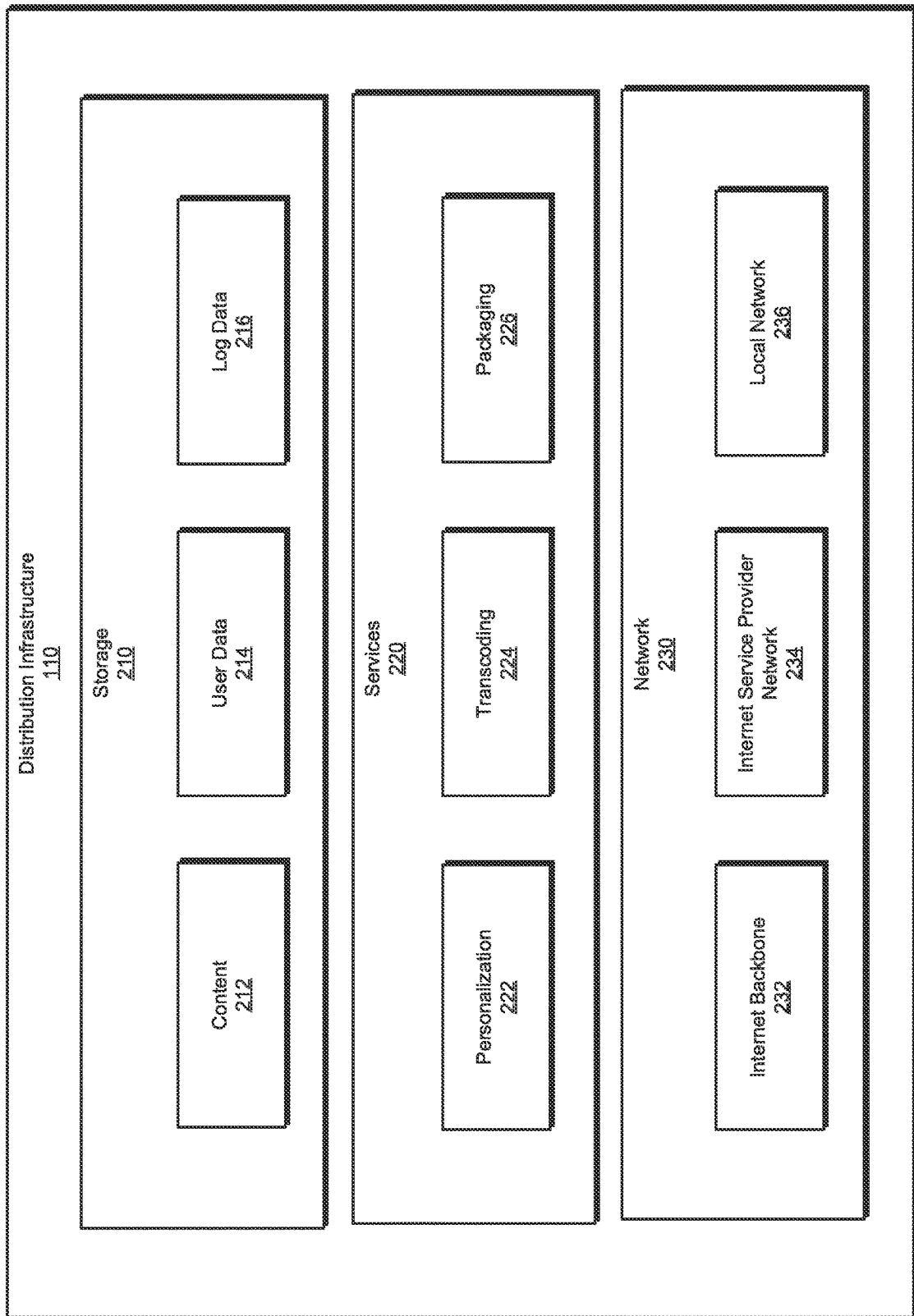
FIG. 2 is a block diagram of an exemplary distribution infrastructure within the content distribution ecosystem shown in FIG. 1.
Figure 3:
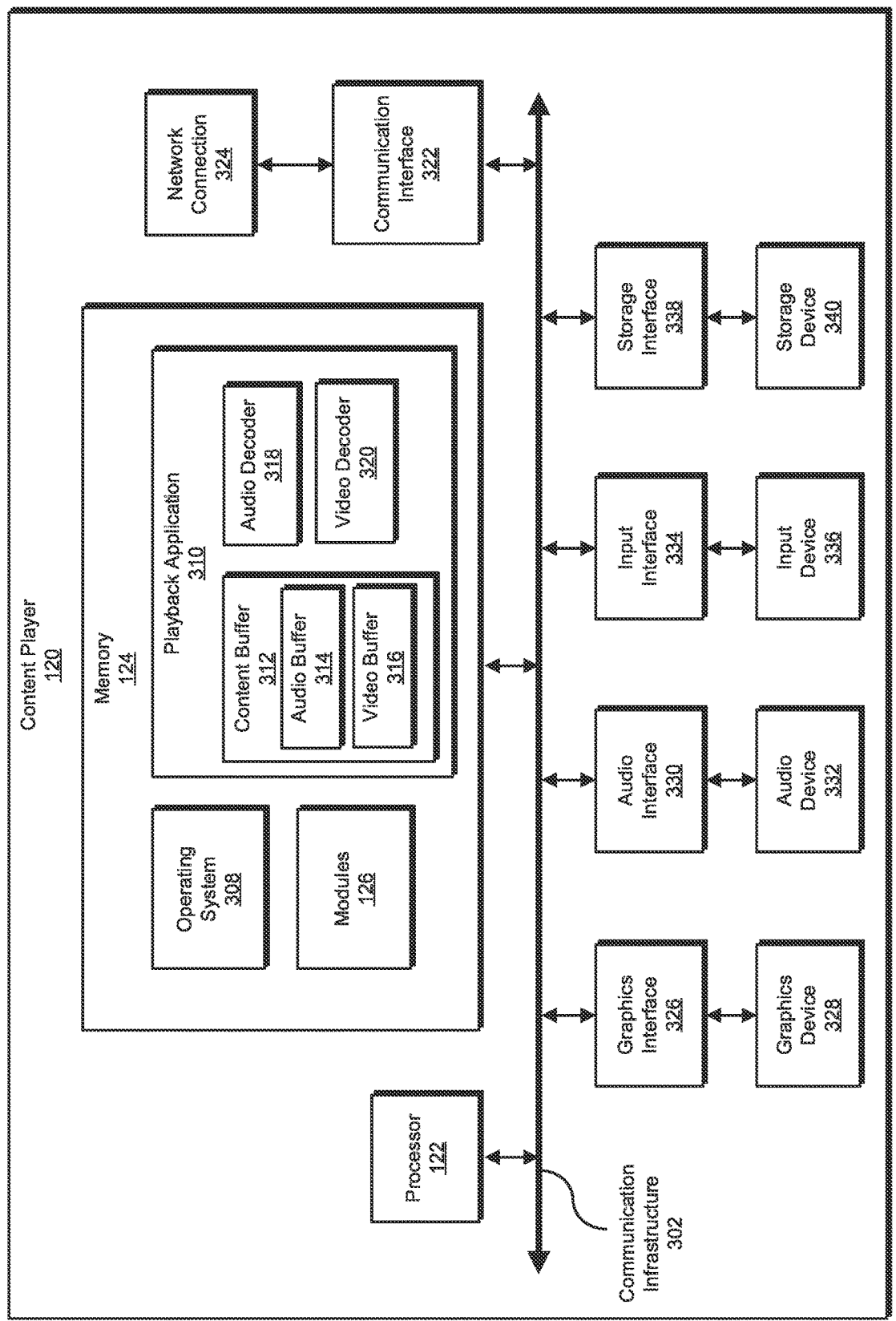
FIG. 3 is a block diagram of an exemplary content player within the content distribution ecosystem shown in FIG. 1.

Because the branching logic can be applied to substantially any media type which may be used in substantially any media provisioning system, FIGS. 1-3 describe many of the ecosystems and methods in which media content may be provided to a user. FIG. 1, for example, provides a detailed description of exemplary ecosystems in which content is provisioned to end nodes and in which requests for content are steered to specific end nodes. The discussion corresponding to FIGS. 2 and 3 presents an overview of an exemplary distribution infrastructure and an exemplary content player used during playback sessions, respectively. Detailed descriptions of corresponding computer-implemented methods for providing an editing interface for generating and applying branch logic to a pre-rendered multimedia item will be provided in connection with FIGS. 4-11.

FIG. 1 is a block diagram of a content distribution ecosystem 100 that includes a distribution infrastructure 110 in communication with a content player 120. In some embodiments, distribution infrastructure 110 is configured to encode data at a specific data rate and to transfer the encoded data to content player 120. Content player 120 is configured to receive the encoded data via distribution infrastructure 110 and to decode the data for playback to a user. The data provided by distribution infrastructure 110 includes, for example, audio, video, text, images, animations, interactive content, haptic data, virtual or augmented reality data, location data, gaming data, or any other type of data that is provided via streaming.

Distribution infrastructure 110 generally represents any services, hardware, software, or other infrastructure components configured to deliver content to end users. For example, distribution infrastructure 110 includes content aggregation systems, media transcoding and packaging services, network components, and/or a variety of other types of hardware and software. In some cases, distribution infrastructure 110 is implemented as a highly complex distribution system, a single media server or device, or anything in between. In some examples, regardless of size or complexity, distribution infrastructure 110 includes at least one physical processor 112 and at least one memory device 114. One or more modules 116 are stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 includes a physical processor 122, memory 124, and one or more modules 126. Some or all of the adaptive streaming processes described herein is performed or enabled by modules 126, and in some examples, modules 116 of distribution infrastructure 110 coordinate with modules 126 of content player 120 to provide adaptive streaming of multimedia content.

In certain embodiments, one or more of modules 116 and/or 126 in FIG. 1 represent one or more software applications or programs that, when executed by a computing device, cause the computing device to perform one or more tasks. For example, and as will be described in greater detail below, one or more of modules 116 and 126 represent modules stored and configured to run on one or more general-purpose computing devices. One or more of modules 116 and 126 in FIG. 1 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 access and/or modify one or more of modules 116 and 126, respectively. Additionally or alternatively, physical processors 112 and 122 execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 stores, loads, and/or maintains one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 includes storage 210, services 220, and a network 230. Storage 210 generally represents any device, set of devices, and/or systems capable of storing content for delivery to end users. Storage 210 includes a central repository with devices capable of storing terabytes or petabytes of data and/or includes distributed storage systems (e.g., appliances that mirror or cache content at Internet interconnect locations to provide faster access to the mirrored content within certain regions). Storage 210 is also configured in any other suitable manner.

As shown, storage 210 may store a variety of different items including content 212, user data 214, and/or log data 216. Content 212 includes television shows, movies, video games, user-generated content, and/or any other suitable type or form of content. User data 214 includes personally identifiable information (PII), payment information, preference settings, language and accessibility settings, and/or any other information associated with a particular user or content player. Log data 216 includes viewing history information, network throughput information, and/or any other metrics associated with a user's connection to or interactions with distribution infrastructure 110.

Services 220 includes personalization services 222, transcoding services 224, and/or packaging services 226. Personalization services 222 personalize recommendations, content streams, and/or other aspects of a user's experience with distribution infrastructure 110. Encoding services 224 compress media at different bitrates which, as described in greater detail below, enable real-time switching between different encodings. Packaging services 226 package encoded video before deploying it to a delivery network, such as network 230, for streaming.

Network 230 generally represents any medium or architecture capable of facilitating communication or data transfer. Network 230 facilitates communication and data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 includes an Internet backbone 232, an internet service provider 234, and/or a local network 236. As discussed in greater detail below, bandwidth limitations and bottlenecks within one or more of these network segments triggers video and/or audio bit rate adjustments.

FIG. 3 is a block diagram of an exemplary implementation of content player 120 of FIG. 1. Content player 120 generally represents any type or form of computing device capable of reading computer-executable instructions. Content player 120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 includes a communication infrastructure 302 and a communication interface 322 coupled to a network connection 324. Content player 120 also includes a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 stores and/or loads an operating system 308 for execution by processor 122. In one example, operating system 308 includes and/or represents software that manages computer hardware and software resources and/or provides common services to computer programs and/or applications on content player 120.

Operating system 308 performs various system management functions, such as managing hardware components (e.g., graphics interface 326, audio interface 330, input interface 334, and/or storage interface 338). Operating system 308 also provides process and memory management models for playback application 310. The modules of playback application 310 includes, for example, a content buffer 312, an audio decoder 318, and a video decoder 320.

Playback application 310 is configured to retrieve digital content via communication interface 322 and play the digital content through graphics interface 326. Graphics interface 326 is configured to transmit a rendered video signal to graphics device 328. In normal operation, playback application 310 receives a request from a user to play a specific title or specific content. Playback application 310 then identifies one or more encoded video and audio streams associated with the requested title. After playback application 310 has located the encoded streams associated with the requested title, playback application 310 downloads sequence header indices associated with each encoded stream associated with the requested title from distribution infrastructure 110. A sequence header index associated with encoded content includes information related to the encoded sequence of data included in the encoded content.

In one embodiment, playback application 310 begins downloading the content associated with the requested title by downloading sequence data encoded to the lowest audio and/or video playback bitrates to minimize startup time for playback. The requested digital content file is then downloaded into content buffer 312, which is configured to serve as a first-in, first-out queue. In one embodiment, each unit of downloaded data includes a unit of video data or a unit of audio data. As units of video data associated with the requested digital content file are downloaded to the content player 120, the units of video data are pushed into the content buffer 312. Similarly, as units of audio data associated with the requested digital content file are downloaded to the content player 120, the units of audio data are pushed into the content buffer 312. In one embodiment, the units of video data are stored in video buffer 316 within content buffer 312 and the units of audio data are stored in audio buffer 314 of content buffer 312.

A video decoder 320 reads units of video data from video buffer 316 and outputs the units of video data in a sequence of video frames corresponding in duration to the fixed span of playback time. Reading a unit of video data from video buffer 316 effectively de-queues the unit of video data from video buffer 316. The sequence of video frames is then rendered by graphics interface 326 and transmitted to graphics device 328 to be displayed to a user.

An audio decoder 318 reads units of audio data from audio buffer 314 and output the units of audio data as a sequence of audio samples, generally synchronized in time with a sequence of decoded video frames. In one embodiment, the sequence of audio samples are transmitted to audio interface 330, which converts the sequence of audio samples into an electrical audio signal. The electrical audio signal is then transmitted to a speaker of audio device 332, which, in response, generates an acoustic output.

In situations where the bandwidth of distribution infrastructure 110 is limited and/or variable, playback application 310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 326 is configured to generate frames of video data and transmit the frames of video data to graphics device 328. In one embodiment, graphics interface 326 is included as part of an integrated circuit, along with processor 122. Alternatively, graphics interface 326 is configured as a hardware accelerator that is distinct from (i.e., is not integrated within) a chipset that includes processor 122.

Graphics interface 326 generally represents any type or form of device configured to forward images for display on graphics device 328. For example, graphics device 328 is fabricated using liquid crystal display (LCD) technology, cathode-ray technology, and light-emitting diode (LED) display technology (either organic or inorganic). In some embodiments, graphics device 328 also includes a virtual reality display and/or an augmented reality display. Graphics device 328 includes any technically feasible means for generating an image for display. In other words, graphics device 328 generally represents any type or form of device capable of visually displaying information forwarded by graphics interface 326.

As illustrated in FIG. 3, content player 120 also includes at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 also includes a storage device 340 coupled to communication infrastructure 302 via a storage interface 338. Storage device 340 generally represents any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems are included in or connected to content player 120. Conversely, one or more of the components and devices illustrated in FIG. 3 need not be present to practice the embodiments described and/or illustrated herein. The devices and subsystems referenced above are also interconnected in different ways from that shown in FIG. 3. Content player 120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 120. All or a portion of the computer program stored on the computer-readable medium is then stored in memory 124 and/or storage device 340. When executed by processor 122, a computer program loaded into memory 124 causes processor 122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 120 is configured as an Application Specific Integrated Circuit (ASIC) adapted to implement one or more of the example embodiments disclosed herein.

Figure 4:
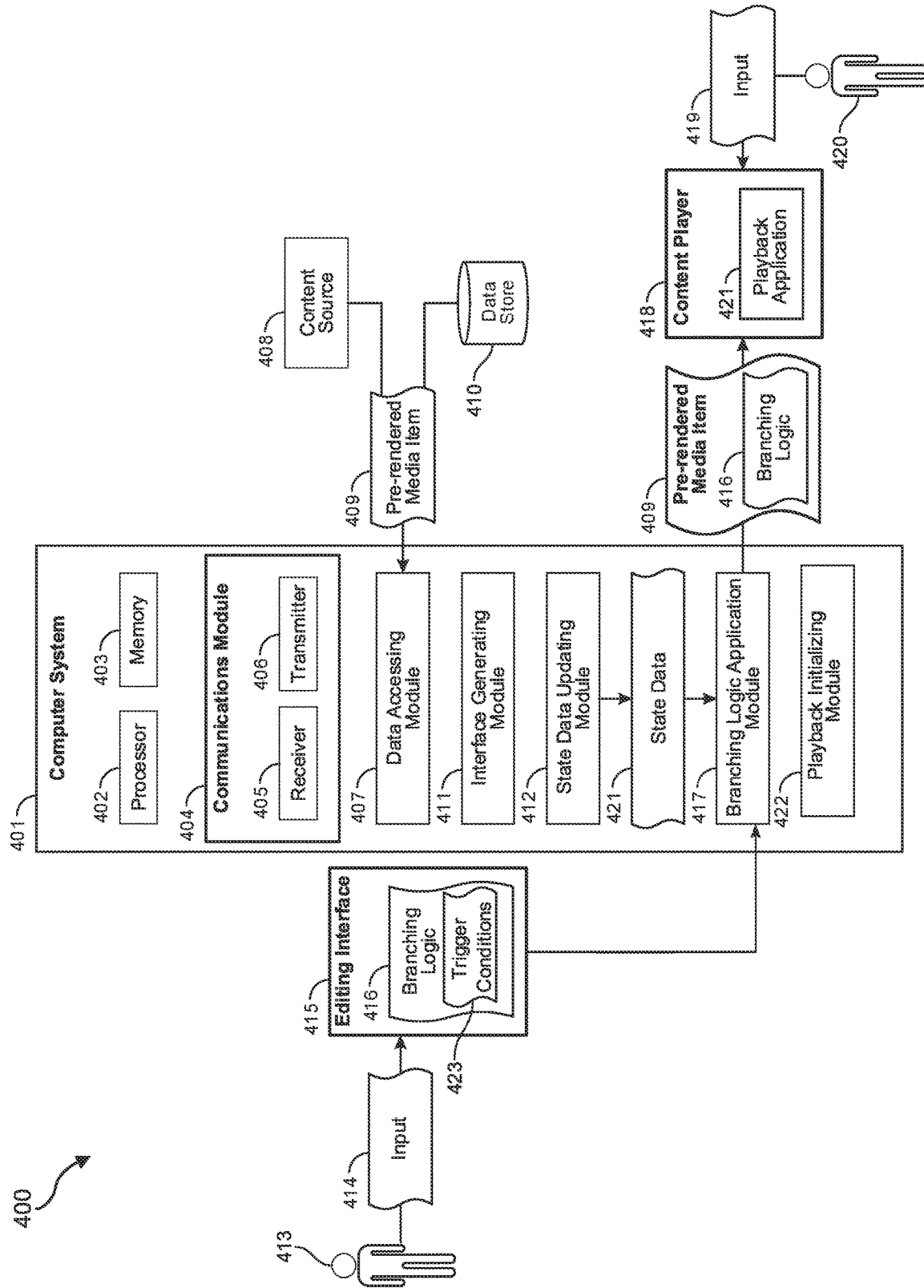
FIG. 4 is a computing architecture in which a pre-rendered multimedia item may be played back according to branching points implemented as a result of triggering conditions.

FIG. 4 illustrates a computing environment 400 that includes a computer system 401. The computer system 401 may be a software module, an embedded hardware component such as a processor, or a computer system. The computer system 401 may be substantially any type of computing system including a local computing system or a distributed (e.g., cloud) computing system. In some cases, the computer system 401 may include at least one processor 402 and at least some system memory 403. The computer system 401 may include program modules for performing a variety of different functions. The program modules may be hardware-based, software-based, or may include a combination of hardware and software. Each program module uses computing hardware and/or software to perform specified functions, including those described herein below.

The computer system 401 may also include a communications module 404 that is configured to communicate with other computer systems. The communications module 404 includes any wired or wireless communication means that can receive and/or transmit data to or from other computer systems. These communication means include hardware interfaces including Ethernet adapters, WIFI adapters, hardware radios including, for example, a hardware-based receiver 405, a hardware-based transmitter 406, or a combined hardware-based transceiver capable of both receiving and transmitting data. The radios are cellular radios, Bluetooth radios, global positioning system (GPS) radios, or other types of radios. The communications module 404 is configured to interact with databases, mobile computing devices (such as mobile phones or tablets), embedded or other types of computing systems.

The computer system 401 also includes a data accessing module 407. The data accessing module 407 may be configured to access media items including pre-rendered media item 409. The pre-rendered media item 409 may be any type of media item including a movie, a tv show, an audio song, a presentation, or any other type of media item that is capable of being rendered prior to distribution. In some cases, the pre-rendered media item 409 may be stored in a data store 410 which may be a local or distributed data store (e.g., a cloud data store). In other cases, the pre-rendered media item 409 may be streamed directly from a content source 408 to a user (e.g., 420) or from a server owned or managed by the content source 408. In still other cases, the pre-rendered media item 409 may be provided to computer system 401 where branching logic may be applied prior to or during streaming.

For example, the data accessing module 407 may access pre-rendered media item 409 from content source 408 or from data store 410 after which the interface generating module 411 may generate an editing interface (e.g., 415). The editing interface may be used to define and/or apply branching logic 416 to the pre-rendered media item 409. In some cases, the branching logic 416 is applied by a content manager 413 or other user via input 414. In other cases, the branching logic may potentially be applied by a software application or software algorithm designed to automatically generate branching logic for a portion of multimedia content. The "branching logic," as the term is used herein, may include data that defines how a user may interact with the pre-rendered media item 409. For example, the branching logic 416 may specify branching points at which a user may take one of a variety of different routes through the pre-rendered media item 409. For instance, while viewing the pre-rendered media item 409, the viewer 420 may be presented with a choice of X, Y, or Z. Each of these options may direct playback through a different series of media segments within the pre-rendered media item 409. Other branching logic 416 may specify items that the user has collected (e.g., a virtual sword, or virtual currency), or may include preferences associated with the user, or may provide other decisions that the user can make to modify playback of the media content in some form.

As the viewer 420 progresses through the pre-rendered media item 409 (e.g., while watching the media item and making choices at branching points), the state data generating module 412 of computer system 401 may generate custom state data 421 which may be stored with or separate from the branching logic. The state data 421, as will be explained further below, allows the content player 418 to track which decisions the user 420 has made at each branching point, and also stores items associated with the user, preferences associated with the user, or other information used in directing the non-sequential playback of the pre-rendered media item 409. This custom state data may be applied to the pre-rendered media item 409 along with the branching logic 416 by the branching logic application module 417.

The pre-rendered media item 409 may then be sent to the user's content player 418. The content player 418 may be substantially any type of electronic device capable of playing back or presenting a media item). In some cases, the content player includes hardware, and in other cases, the content player includes software or a mix of software and hardware. In cases where the content player includes software, the content player 418 may include a playback software application 421 with multiple features or functions. In some cases, one portion of the playback software application 421 may be designed primarily for playback of the pre-rendered media item and simply plays back the pre-rendered media item according to received instructions. Another portion of the playback software application 421 may be designed to interpret branching logic and generate playback instructions for the playback portion of the application. In other cases, two different software applications (or embedded hardware) may perform these functions. Regardless of the mixture of hardware or software functions, the content player 418 may generate and/or interpret branching logic 416 and play back the pre-rendered media item 409.

The pre-rendered media item 409 may include the branching logic 416 applied by module 417, as well as the custom state data 421. As such, each pre-rendered media item 409 streamed from the content source 408 may have branching logic 416 appended thereto. Or, the pre-rendered media item 409 may be streamed directly from the content source having the branching logic and state data 421 already embedded therein streamed alongside the media content. As such, the content player 418 does not need to have any sort of hard-coded rules or logic for playing back the media item in non-sequential manner. Moreover, the content player 418 does not need to dynamically render the media segments on the fly. Rather, the content player 418 may access the branching logic and state that were streamed with the pre-rendered media item 409 and play back the pre-rendered media item 409 in a non-sequential manner that responds to the inputs 419 provided by the user 420. These concepts will be explained further below with regard to method 500 of FIG. 5 as well as the embodiments illustrated in FIGS. 6-11.

Figure 5:
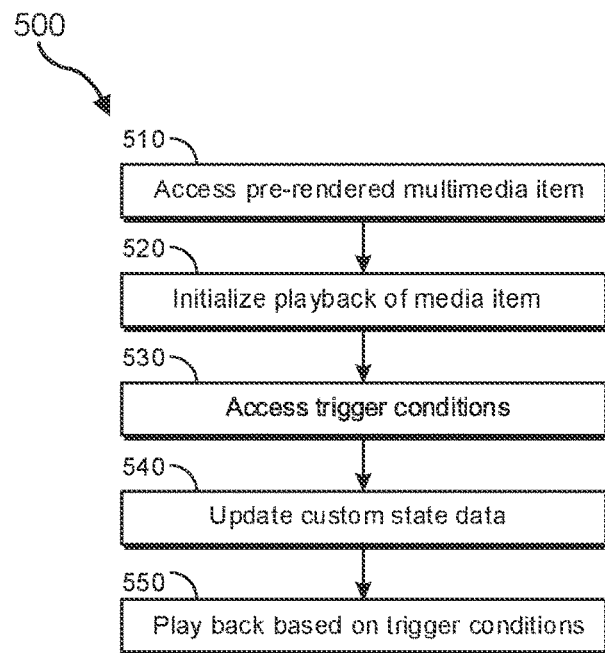
FIG. 5 is a flow diagram of an exemplary method for playing backa pre-rendered multimedia item according to branching points implemented as a result of triggering conditions.

FIG. 5 is a flow diagram of an exemplary computer-implemented method 500 for playing back a pre-rendered multimedia item according to branching logic. The steps shown in FIG. 5 may be performed by any suitable computer-executable code and/or computing system, including the environment 400 illustrated in FIG. 4. In one example, each of the steps shown in FIG. 5 may represent an algorithm whose structure includes and/or is represented by multiple sub-steps, examples of which will be provided in greater detail below.

As illustrated in FIG. 5, at step 510, the data accessing module 407 accesses one or more pre-rendered media items 409 from a content source 408, from a data store 410, or from some other source. The pre-rendered media item 409 may be substantially any type of media item including audio, video, presentation, or other type of item that may be pre-rendered before transmission. The pre-rendered media item 409 may include substantially any number of segments combined together into a single file or data structure. Each segment, as shown in the branching narrative graph of FIG. 6, may have zero or more branching points associated with it. Segment s1 (601) may have a branching point associated with it, for example, that branches to segment s2 (602) or segment s4 (604). Segment s4 may have no branching points, while segment s2 may have a branching point with three different options that lead to segment s3 (603), segment s5 (605), or to segment s6 (606). Segments s3, s5, and s6 may also have branching points associated therewith that, although not shown, take the viewer to other segments.

At a branching point, for example, at s1 (601), a user (e.g., 420 of FIG. 4) may make a selection via input 419. This input may be interpreted by the content player 418 using the branching logic 416 that is streamed with the pre-rendered media item 409 or is accessed separate from the pre-rendered media item. The branching logic 416 may indicate that input "A" leads to segment s2 (602) and input "B" leads to segment s4 (604). Because the pre-rendered media item 409 has already been rendered sequentially, with segments s1-s6 being rendered and stored one consecutively after the other, the content player 418 skips between segments (e.g., skipping from s1 to s4 if input "B" is provided). In other embodiments, where the pre-rendered media item 409 is streamed to the content player, the content source 408 or computer system 401 (which may belong to or may be controlled by the content source) may stream those segments that are to be presented on the content player 418 based on the user's inputs 419. Thus, while the data store 410 or content source 408 store the pre-rendered media item 409 in a single, pre-rendered media file, the data store or content source may provision those segments from the pre-rendered media item 409 that are selected by the user according to branching logic 416.

Figure 6:
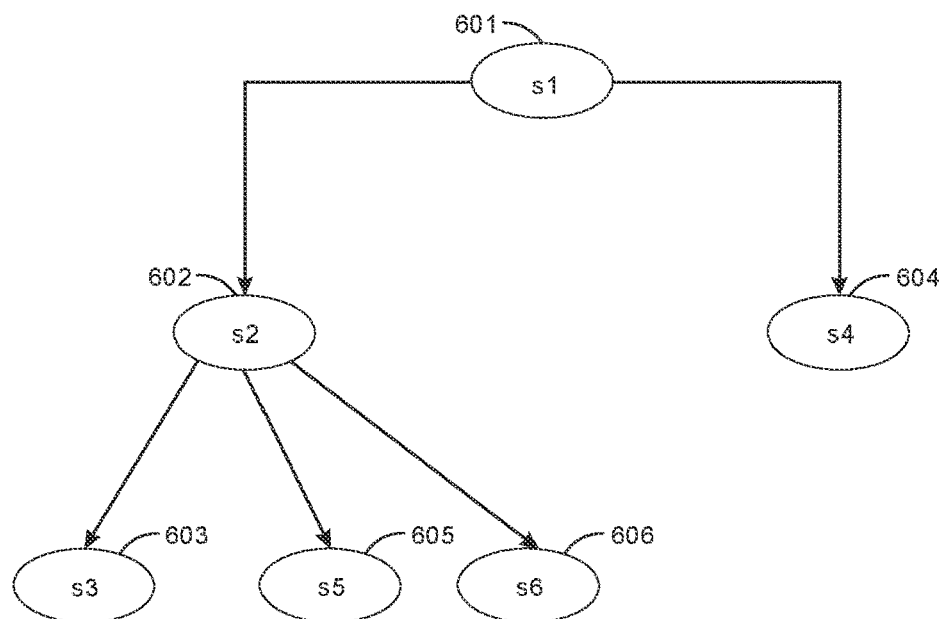
FIG. 6 is a diagram illustrating multiple paths that may be taken through various media segments.

Before this branching logic is applied to the pre-rendered media item 409, it may be created by a content manager in an editing interface. For example, an editing interface 415 may be provided that allows a content manager 413 to specify branching logic for various pre-rendered multimedia items (e.g., 409). As noted above, the branching logic may designate how viewer interactions influence non-sequential playback of the pre-rendered multimedia item. The interface generating module 411 of computer system 401 may generate or instantiate editing interface 415. The editing interface 415 may allow users such as a content manager 413 to define branching logic 416 using input 414. The branching logic 416 may apply to a single pre-rendered multimedia item (e.g., 409), or may apply to multiple multimedia items. The branching logic 416 may specify branching points at which non-sequential playback may begin. For instance, as shown in FIG. 6, non-sequential playback may begin at segment s1 (601). From segment s1, the branching logic may specify that segments s2 or s4 may be played. If segment s2 is chosen, three possible paths may be chosen: s3 (603) which is a sequential segment, or s5 (605) or s6 (606) which are both non-sequential segments based on the original, pre-rendered ordering of the segments. In some cases, if a segment is chosen that does not have any further branching points (e.g., as with segment s4), regular, sequential playback may resume with segment s5 following segment s4 (unless directed otherwise by the branching logic).

While the content manager 413 is defining the branching logic 416, he or she may provide input 414 specifying branching points in the pre-rendered multimedia item 409 for which associated state data is to be generated. The state data updating module 412 may generate and/or update state data 421. As will be explained further below, the state data 421 may represent custom state that is stored for each user that views the pre-rendered media item 409. The custom state may keep track of which selections the user has made throughout the duration of the media item, as well as items that have been collected on the way, or other pieces of state. Once these pieces of custom state data 421 have been defined for the pre-rendered media item 409, the branching logic application module 417 may apply the branching logic and state data 421 to the pre-rendered media item 409 and provide the pre-rendered media item 409 to the content player 418 for playback to the viewer 420. Because the viewer 420 can choose his or her own path through the media item, the experience can be much more personalized and customized for that user and may be tailored to that user's tastes and preferences. This tailoring may be provided by using custom state data 421. Indeed, this custom state data 421 may be stored at one or more of the branching points in the multimedia item. As will be explained further below, this custom state data may include primitives or complex objects, where each primitive or complex object has an associated portion of logic that defines how branching point operations are to occur.

Still further, at least in some embodiments, the branching logic may not only be generated for a specific pre-rendered media item, but may be personalized for a specific user or for a specific device. For example, the branching logic 416 may be customized to include branching points that only occur for a specified user or may provide branching selections that are only available on specific types of devices or with certain media items. The personalized branching logic may present different styles of branching selections. Thus, for instance, a single branching point may have different styles of choice selections based on the user's preferences. Or, the branching point may have different choice selections entirely based on the personalized branching logic. Content managers may design the branching logic to gather information about the user and tailor or modify the branching logic 416 for that user based on the user's preferences, previous selections (e.g., historical data), previously viewed media items, or based on other information. Moreover, at least in some cases, the branching logic 416 may be changed at the content player 418 based on updates received from the content source 408 or from the computer system 401. Or, the branching logic 418 may be changed dynamically based on input 419 from the user. Thus, at least in some cases, the branching logic 416 initially applied by the content manager 413 may later be modified or updated based on preferences, selections by the user, or other characteristics of the user 420.

As noted above, FIG. 6 illustrates an embodiment of a branching narrative graph. Unlike traditional forms of branching narratives (e.g., video games) where scenes may be rendered dynamically on the fly, the branching structure and the comprehensive set of segments or scenes that make up the narrative graph (e.g., s1-s6) are compiled together at encode-time for branching narrative videos. Since a video or similar media item is a linear structure, the video frames may be initially laid out from s1-s6 (or in some other order). In such cases, the entire video is composed of logical segments that map 1-to-1 to the nodes in the branching narrative graph.

Figure 7:
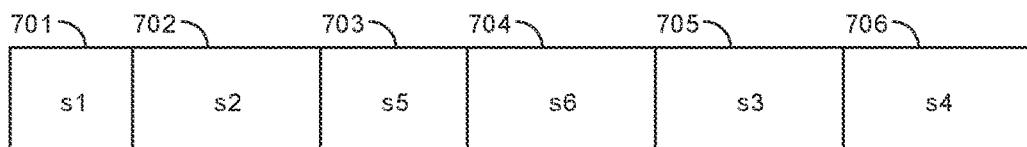
FIG. 7 is a diagram showing how the media segments are pre-rendered in a media file.

During playback, however, users may be directed down different branches in the narrative. For example, the method 500 of FIG. 5 details an embodiment in which a pre-rendered media item is played back according to branching logic (e.g., 416). At step 510, the data accessing module 407 of FIG. 4 may access a pre-rendered multimedia item 409. The pre-rendered multimedia item 409 may have branching logic 416 associated with it. The branching logic may include one or more branching points that direct non-sequential playback of the pre-rendered multimedia item. For instance, the logical segments of the video in FIG. 7 are ordered as s1->s2->s5->s6->s3->s4. In FIG. 7, some of the segments are ordered sequentially (e.g., s1 and s2, and s5 and s6), and some are ordered non-sequentially (e.g., s6 and s3). Some segments may thus be shown in the order in their pre-rendered order, and some may be shown out of order or not shown at all in any given playback session. As such, the branching logic 416 may define where in the video a user should go next from each segment.

The branching logic that is used to direct users down different branches in a branching narrative may be specific to each media item. The embodiments described herein may be cross-platform, and as such, may be supported on multiple different types of user interface including on smartphone user interfaces (UIs), tablet UIs, personal computer (PC) UIs, television UIs, web or browser UIs, automobile UIs, or other types of user interfaces. Unlike video games that may deploy custom builds for each game, the systems described herein may deploy new branching narrative media items, each having its own set of logic, in such a way that users are not forced to upgrade their UI builds to take advantage of the new experiences. To reduce the impact of this new type of content on any existing media provisioning infrastructure, at least some of the branch decision processing may be performed on the content playing devices (e.g., 418 of FIG. 4). In other cases, execution of the branching logic may be performed entirely on the server-side (this will be described further below with regard to FIGS. 10 and 11).

Method 500 of FIG. 5 includes initializing playback of the pre-rendered multimedia item (step 520) and accessing, at the one or more branching points, one or more trigger conditions that direct playback order of one or more segments of the pre-rendered multimedia item (step 530). The playback initializing module 422 may initialize playback of the pre-rendered media item either directly on computer system 401 or on a content player 418. The playback may begin at the beginning of the pre-rendered multimedia item, or at some other point in the media item. The branching logic application module 417 may access trigger conditions 423 that are part of (or may be defined separate from) the branching logic 416. These trigger conditions 423 may be substantially anything that would cause branching point logic to be executed. In some cases, for example, a trigger condition 423 may be input from a user. An input 419 from user 420, for instance, may trigger execution of some branching point logic that would direct the playback order of different segments (e.g., s1-s6 of FIG. 7) of a pre-rendered multimedia item.

In other cases, a trigger condition 423 may related to time. For instance, a time-based trigger condition may trigger execution of certain branching point logic that (re)directs playback order of certain media segments after a certain amount of time has elapsed, or when a certain time in the duration of the media item is reached, or when a certain real-world time has been reached. Many other time-based variants are also possible. Still further, the trigger condition 423 may be based on an evaluation of the current condition or state of the custom state data 421. The custom state data at one branching point may be set to "True" or "False" or "Sword" or "Pistol" or "Character A" or "Character B" or some other value. Based on the current state of this custom state data 421, the trigger condition 423 may be met or not met, or may be met in a specific way that causes a specific action. Accordingly, the trigger condition 423 may cause execution of certain branching point logic based on the current condition or state of that state data. Other types of trigger conditions 423 may also be used, alone or in conjunction with the trigger conditions described above.

Method 500 may next include (at step 540) updating, based on the trigger conditions, at least a portion of custom state data, and (at step 550) playing back the one or more segments of the pre-rendered multimedia item according to the trigger conditions. The state updating module 412 of computer system 401 may update the state data 421 according to or as a result of the trigger conditions 423, and then play back the various segments of the pre-rendered multimedia item 409 according to the updated state data. In this manner, custom state data may be used to provide a highly-customized playback experience for each pre-rendered multimedia item and for each user.

Figure 8:
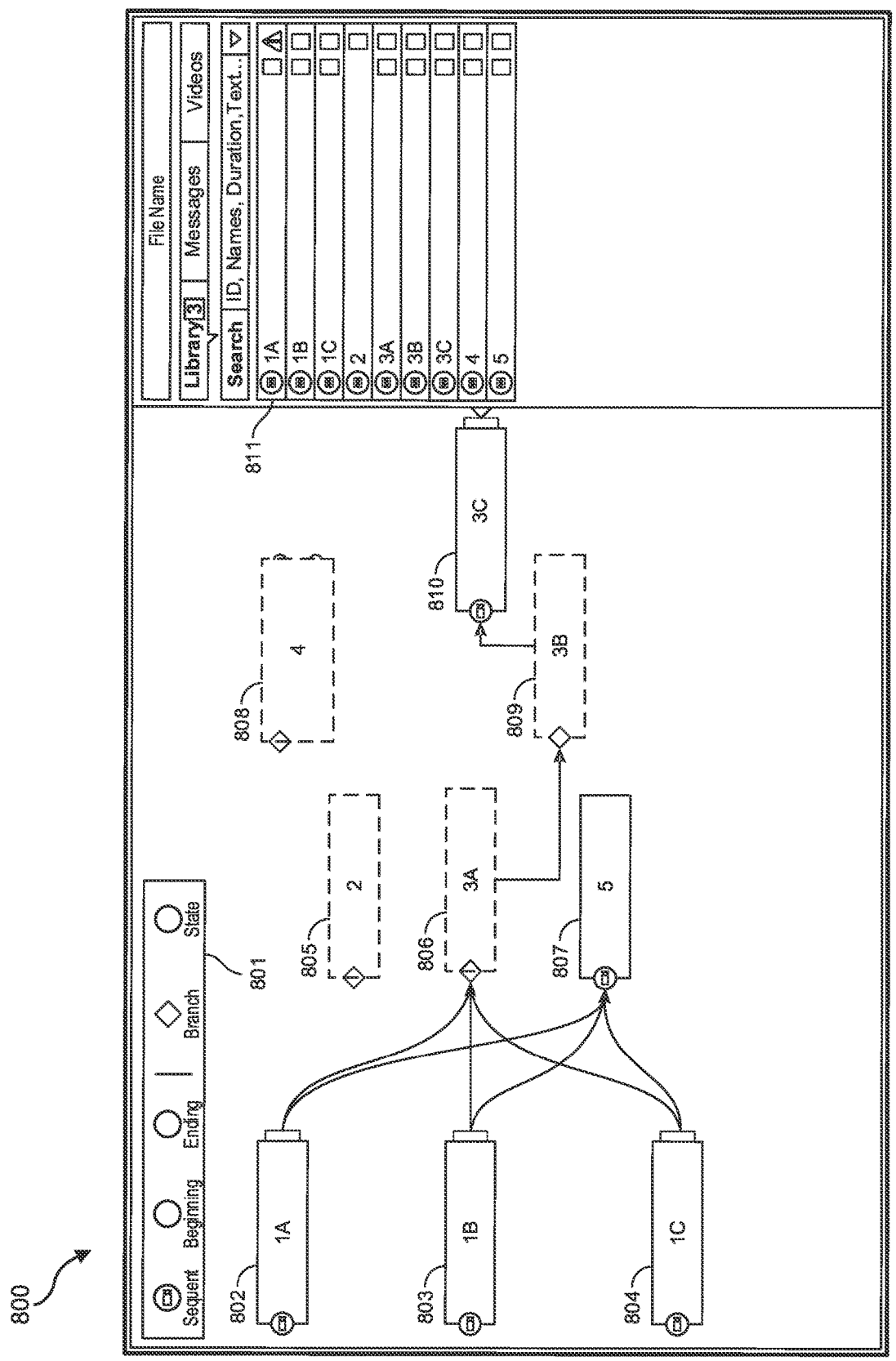
FIG. 8 illustrates an embodiment of an editing interface that allows users to assign branching logic to media content.
Figure 9:
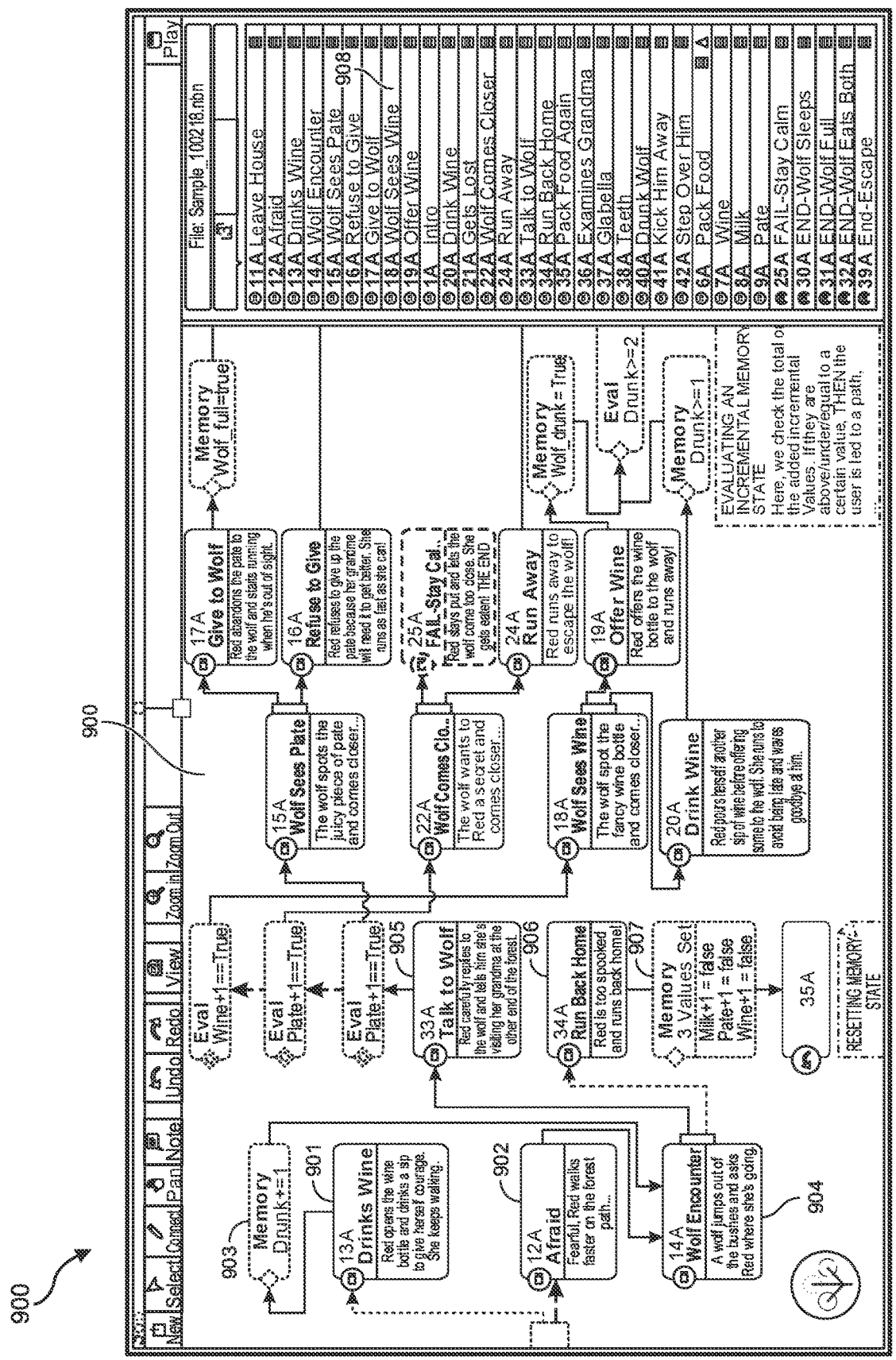
FIG. 9 illustrates an alternative embodiment of an editing interface that allows users to assign branching logic to media content.

FIGS. 8 and 9 illustrate embodiments of example editing interfaces in which users may view, edit, define, or otherwise create branching logic for a given media item. The branching logic may be created using a domain-specific language (DSL) that applies to pre-rendered media items. The DSL may be a declarative language that allows users to declaratively state their intentions for a given branch. For example, in FIG. 8, the editing interface 800 (which may be the same as or different than editing interface 415 of FIG. 4) may include various branching elements 802-810 that may be applied to any of the segments in the media item (e.g., segments s1-s6 of FIG. 6). The branching elements 802-810 may include branching points, custom state data, or other information. In some embodiments, the branching elements may be added by clicking one of the menu items in UI menu 801. For instance, if a user wanted to add or define a segment (e.g., as including a specific scene, or as lasting from 1:09-1:31, etc.), the user could select the "Segment" button in menu 801. If the user wanted to designate the beginning or ending of the media item, they could do so using the "Beginning" or "Ending" buttons. If the user wanted to apply a branch or add state data, the user could select the "Branch" or "State" data buttons in menu 801.

In some cases, the user may thus be able to select which components to add to which segments and the editing interface 800 may apply the selections to the pre-rendered media item. The right-hand menu 811 may allow users to see details related to each branching element 802-810 and may allow users to edit those details. For instance, segment 1A branches to elements 1C (804) and 5 (807), while element 1B (803) branches to 3A (806) and 5. Elements 805, 806, 808, and 809 may represent state data that can be set or changed using the editing interface 800. Although not shown, the UI may continue to the left and/or to the right, providing access to branch elements before elements 802-804 and after element 810. FIG. 9 provides a detailed example of possible branches, state data, and other items that may be created or edited using the editing interfaces described herein. Indeed, the editing user may be able to visually track custom state data and branch path options, as well as apply changes simply by dragging and dropping branch connections or adding new options via the element change menu 908.

For instance, the editing interface 900 of FIG. 9 includes multiple different branching points 12A-35A, along with custom state elements (e.g., 903) and other branching elements. Each branching point may include text defining that point (e.g., branching point 13A (901)) indicates that a character has an option to drink wine. If the viewing user opts to have the character drink the wine at 13A, the custom state 903 may be changed to show that the character did drink the wine. This state change may affect other branching points (e.g., Wolf Encounter 14A (904) or potentially other points). Branching point 14A may also be affected by branching point 12A (902). A rules engine may be configured to process the branching options as a viewing experience progresses. Throughout the course of the movie or tv show of FIG. 9, various paths may be taken and state data may be stored at each branching point. As can be seen in FIG. 9, each branching point may be affected by decisions made earlier in the viewing experience. Branching points 33A (905) and 34A (906) may be affected by branching point 14A, which in turn, is affected by branching points 12A (902) and 13A (901), each of which may be affected by previous branching points. As a movie or tv show is played back, the rules engine may control how the user progresses and how various state data is established and updated.

In some embodiments, some or all of the user's selections with respect to a pre-rendered media item may be stored as part of a session. In order to drive users down different branches in a story, embodiments herein may provide the ability to react to various users' actions. Sometimes, the viewer's actions may trigger an immediate branch change, while in other cases a user action may not alter the narrative until much later on in the movie or tv show. In some embodiments, the viewer's actions may even trigger changes in other movies or tv shows. For instance, a state change in video A may affect options or paths available in movie B or tv show C. Typically, however, the viewer's actions will only trigger changes within the same piece of media. A change in state (e.g., at 907) may cause an immediate change in routing, or may set up a delayed branch change that occurs much later in the movie or tv show. In some cases, the state data may be complex and may include multiple different settings (e.g., as in 907) or may include multiple different types of data. The custom state data may be customized for each user and for each session with that user. Each user action that may result in a branch change (whether it be immediate or delayed) may be translated into a piece of custom state. In addition to user actions, custom state may also be saved if the user reaches a certain point in the movie or tv show.

In some embodiments, two or more different types of custom state may be used: session state that is intended to be persisted for the duration of the playback or application session, and persistent state that is intended to be persisted for as long as the user is subscribed to the multimedia provisioning service (e.g., 408 of FIG. 4). In some cases, the user's persistent state may be resettable by the user. At least in some embodiments, user's may manage, reset, or edit their persistent state data. Each type of state data may be stored on the viewer's client device (e.g., content player 418) and/or on a remote data store (e.g., 410). Each piece of custom state may have a value type and a default value. The default values may be used to seed the initial (e.g., default) state for the user. When the custom state data is saved or updated, some or all of the custom state data may be stored in a snapshot. The custom state snapshot may be stored on the content player 418 and/or on a remote server such as data store 410. The snapshot may be stored dynamically while progressing through the movie or tv show, and may grow as new user selections (and hence state changes) are made. The snapshot may be annotated with timestamps, such that one version of a timestamp may include all custom state data from time 0:00:00-0:15:00 and another version of the snapshot may include all custom state data from 0:00:00-0:30:00. Thus, new state data may be continually added to the snapshot and timestamped as it is created or changed by the actions of the viewer.

The continually-updated snapshot(s) allow the system to ensure consistency in the viewer's state, even in cases where the viewer stops viewing and resumes at another time, or is experiencing transmission issues. Accordingly, in such cases, if a user resumes playback of the media item at a later time, the computer system 401 may consult the stored snapshot to access the viewer's custom state data associated with that session and resume playback as if the viewer had never stopped playback. In some embodiments, one or more snapshots may be stored and updated periodically based on a certain time interval (e.g., every thirty seconds, or every minute, or every five minutes, etc.). In other cases, one or more snapshots may be stored per logical segment (e.g., a scene in a movie). Each of these snapshots may be viewed as "save slots" for the user's playback experience. Such save slots may allow the user to rewind the video just as they would a normal video. However, unlike with standard video, a branching narrative video includes multiple branching paths. By using the save slots, the viewer may rewind the video and the viewer's current position in the video and the user's state data will also be rewound, such that the user will be at the previous point in the branching narrative video with state restored up to that point but not further. Thus, if desired, the user may select a new path with all previous selections through the video intact. A snapshot update may be sent to the data store 410 once the user begins to make new path decisions within the branching narrative video or whenever the user starts playback of a new logical segment.

Figure 10:
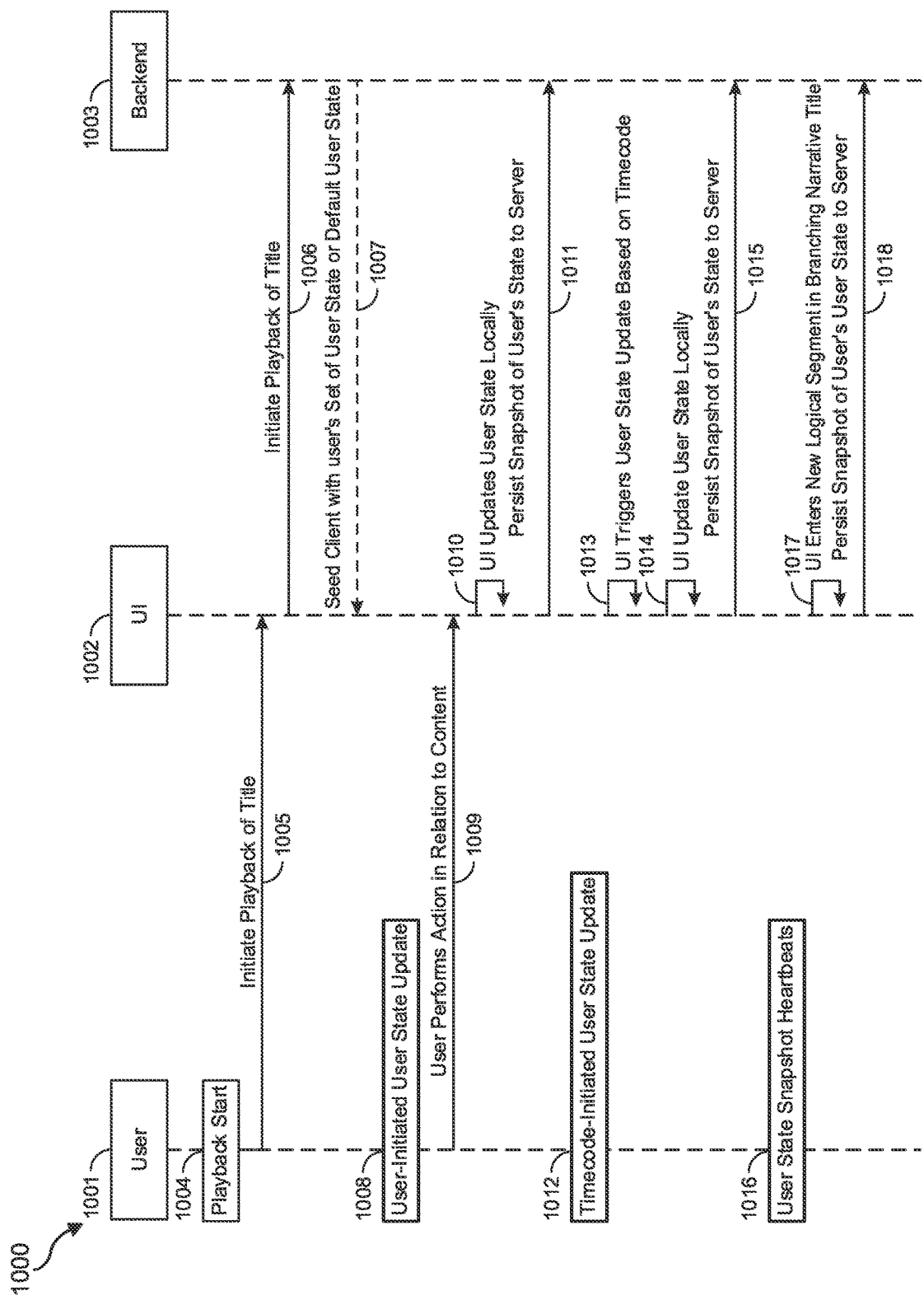
FIG. 10 illustrates an interaction diagram for saving custom state within media content having branching logic.

FIG. 10 illustrates an interaction diagram 1000 illustrating how state (including state snapshots) may be passed between a client (e.g., UI 1002) and a server (e.g., backend 1003). At 1004, a user 1001 may initiate playback of a title by selecting a button with their finger, with their voice, with a mouse, or by some other input means. The "initiate playback" signal 1005 may provided to the UI 1002 which then sends the "initiate playback" signal 1006 to the backend 1003. The backend 1003 may then seed the client with a specified set of user state which may be default state data at 1007. The user 1001 may then initiate a user state update at 1008 by performing an action in relation to content at 1009. At 1010, the UI may update the user state locally based on the action performed (e.g., selecting a particular branch at a branching point). The UI may also persist one or more snapshots of the user's state data to the backend server 1003 at 1011.

In some embodiments, as noted above, the user's state data may be updated based on reaching a certain timecode in the video or tv show, or may automatically update after a certain amount of viewing time has elapsed. This time-based user state update may occur at 1012 in FIG. 10. The UI 1002 may trigger a user state update upon reaching the time marker at 1013 and the UI 1002 may update the user's state data locally on the client device at 1014. In some embodiments, it should be noted, the trigger at time marker 1013 may be a time-based trigger, a user-input-based trigger, a state or event-based trigger, or some other type of trigger. The UI 1002 may also persist one or more snapshots of the user's state data to the backend server at 1015. During the course of viewing the pre-rendered media item, the UI may save the user's state for that session as part of a "heartbeat" at 1016. The heartbeats may ensure that the user's custom state data and the user's video bookmark indicating where the user is in the video remain in synch. When the UI enters a new logical segment in the branching narrative media item at 1017, the UI may take that as an indication to again persist the user's state data for the session to the backend server at 1018. In this manner, regardless of how or when the user finishes watching a movie that has been paused, stopped, or interrupted, the user's state is backed up on the server 1003 and the user will be able to resume with all prior decisions and state data intact.

Figure 11:
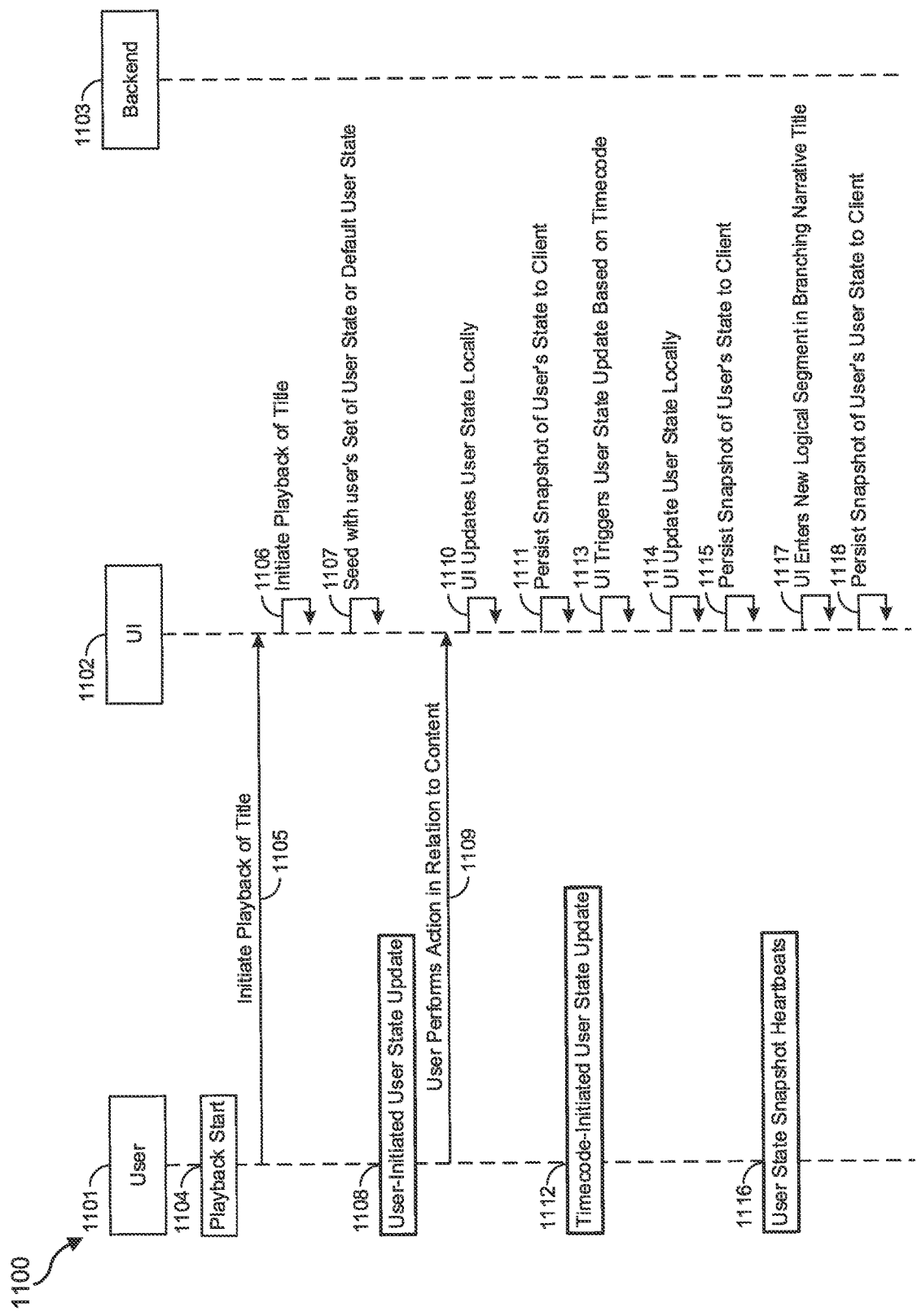
FIG. 11 illustrates an alternative interaction diagram for saving custom state within media content having branching logic.

In some embodiments, as shown in chart 1100 of FIG. 11, a client device may save state data and operate without interaction with the backend server 1103. Thus, for instance, if the client device (represented by UI 1102) is out of range of a computer network or is in an environment with no available networks, the steps of persisting state data may be performed locally on the client device. Once connected to a network, the state data updates/snapshots may be uploaded to the server 1103. Thus, as in FIG. 10, the user 1101 may indicate that playback is to start at 1104, providing an input indicating such to the UI at 1105. The UI 1102 may then initiate playback of the title at 1106. The UI may also seed available state data slots with default state data or data that is specific to the user (e.g., based on user preferences or based on interactions during previous viewing sessions) at 1107. In some cases, the user 1101 may initiate a state update at 1108 by performing an action 1109 such as selecting a branch in a branching narrative. The UI 1102 may update the user state locally at 1110 and may persist one or more snapshots of the user's state data locally at 1111.

In cases where the user's state data is to be updated based on timecode at 1112, the UI 1102 may trigger a state update upon reaching the timecode at 1113 and update user state locally at 1114 along with saving one or more snapshots at 1115. Moreover, if the user indicates that state snapshots are to be saved at 1116, such as when the user enters a new logical segment at 1117, the UI 1102 may persist the user's state to the client device at 1118. If the client device subsequently comes in range with a computer network, some or all of the snapshot state data may be uploaded to the server 1103 for long-term persistence.

In some embodiments, the custom state data (e.g., 421 of FIG. 4) may have a specified format or may include certain content to function properly at scale. In some cases, in order to support custom, video-specific needs at large scale (e.g., with potentially millions of client nodes), a list-based structure with prefix notation may be used to define how a piece of state should be created or updated. This list-based structure with prefix notation may be referred to as declarative syntax. This declarative syntax allows a user to define video-specific information once and have it work on multiple different client devices or user interfaces. The declarative syntax may include various functions including "set" which allows a user to set a piece of state to a specific value, "add" which allows a user to add a two values or increment a single value, "subtract" which allows a user to subtract one value from another or decrement a single value, "multiply" which allows a user to multiply two values together, and "divide" which allows a user to divide one value by another. In one example, the "set" command could be used as follows: ['set', 'p_tt', true]. This would set the state of 'p_tt' to the value true.

A custom rules engine may be implemented to support the custom, video-specific application of branching logic at large scale. As with the challenges of saving and updating state data at large scale, applying custom, video-specific branching logic at large scale (again, potentially many millions of nodes, simultaneously) may burden traditional distribution systems. The embodiments described herein may provide a custom rules engine and an associated domain-specific language for rule definitions for driving the branching logic for branching narrative media items. This custom rules engine (which may be applied on the backend servers and/or on the client device) may interpret the domain-specific language and apply the branching logic as it is declaratively defined. The declarative rules may be similarly interpreted and applied on a variety of different platforms including smartphones, tablets, televisions, web browsers, or on other client devices.

In some cases, the branching rules are defined as data. This may allow the branching rules to be shared across different UIs that are built using different languages (JavaScript, Java, Objective-C, etc.). The branching rules defined as data may include one or more preconditions. These preconditions for the branching rules may be used to define the conditionals that dictate whether or not a subsequent action is taken. Preconditions may be defined using a list-based structure with prefix notation. For instance, the syntax "['eql', 2, 3]" may be used to represent "2==3". Defining the branching rules as data may provide support for a variety of functions including functions for precondition definitions: add, subtract, multiply, divide, eql (equals), gt (greater than), gte (greater than or equal to), lt (less than), lte (less than or equal to), not, or, or other functions. As such, the branching rules may include much more complicated scenarios than simply selecting "A" to go to path "A" or selecting "B" to go to path "B." Rather, content managers may design complex logic having potentially a plurality of preconditions for each branch. Other functions for accessing persistent state or accessing session state data may also be provided. The domain-specific language may allow content managers and other users to express branching logic of varying complexity in a declarative fashion that operates on a variety of platforms. An example of such declarative code is provided below, where 'getPersistentState' is a function used to access persistent state for 'p_tt' and 'p_cd'. If both state values for 'p_tt' and 'p_cd' are false, the top level 'and' is satisfied.

```
[
  'and',
  [
    'not',
    [
      'getPersistentState',
      'p_tt'
    ]
  ],
  [
    'not',
    [
      'getPersistentState',
      'p_cd'
    ]
  ]
]
```

When a content manager is creating a set of branching rules that is to be executed by the rules engine, those rules may be described using a specified structure. In some cases, the structure includes declaration rules such as those below which may be interpreted and carried out by the branching narrative rules engine.

```
[
  // Rule 1
  {
    precondition: <precondition_1>,
    <action_1>
  },
  // Rule 2
  {
    precondition: <precondition_2>,
    <action_2>
  },
  // Rule 3
  {
    <action_3>
  }
]
```

Branching rules may be executed in the order in which they are declared in the list (as shown above) or in the order outlined in an array of branching rules. In the example above, the execution order would be as follows: 1. Evaluate the precondition for Rule 1 (precondition_1), a. If precondition_1 evaluates to true, execute action_1. Otherwise, proceed to Step 2. 2. Evaluate the precondition for Rule 2 (precondition_2), a. If precondition_2 evaluates to true, execute action_2. Otherwise, proceed to Step 3. 3. Execute action_3 (the else clause). In some embodiments, preconditions may be used to perform logic including deciding whether or not to show a "Video Moment" (e.g., a branching point, an event, or other feature driven off of the playback position in a video), deciding whether or not to show a branch choice during a branching point, deciding whether or not to save or update custom state data, deciding which branch to take at a branching point, determining whether or how to make on-the-fly modification of branch weights, etc.

As indicated above, preconditions may be used to decide whether to show a video moment. These video moments may occur at substantially any point during the video. The video moments may include branching points, notifications, automatic saving or updating of custom state, displaying a certain gif or graphic, or taking other specified actions. Each video moment may be associated with an optional precondition (e.g., a trigger condition). If a precondition is provided, then that precondition is executed via the rules engine to determine whether or not the video moment is eligible to be triggered. Branching point video moments may be defined with a special choices array. Each entry in the choices array may map to specified metadata that may include an optional precondition. If a precondition is specified, then that precondition is executed at runtime to determine whether or not the choice should be displayed to the user. For instances where the saving or updating of custom state is not user-initiated, the content manager may associate a precondition to various specified triggers. If the precondition is satisfied, the trigger will execute and, if the precondition is not satisfied, the trigger will not execute.

In some embodiments, segment groups may be used to decide which branch to take for the following two cases: 1) automatic branch decision (based on the current segment that a user is in), and 2) user-initiated branch decision (based on user input). In one example, a segment group may be defined using the following structure:

```
{
    "segmentGroups": {
        "segmentGroupId":
        {
            {
                segmentId: <target_segment_1>,
                precondition: <precondition_for_target_segment_1>
            },
            {
                segmentId: <target_segment_2>,
                precondition: <precondition_for_target_segment_2>
            },
            {
                segmentId: <target_segment_3>,
                precondition: <precondition_for_target_segment_2>
            }
        ]
    }
}
```

In another example, a segment group may be defined in which optional user state may be set once the system has resolved a segment group. Such a segment group may be defined using this modified "segmentGroupId":

```
{
    segmentId: <target_segment>,
    precondition: <precondition_for_target_segment>,
    userState: <userState_for_target_segment>
}
```

An automatic branch decision may be executed as follows: 1) The application enters a new logical segment (e.g., a movie scene) for a branching narrative video. 2) The UI checks the segment group's map or registry and checks for a segment group identifier that matches the identifier of the current logical segment. 2a) If an entry does not exist, then no additional steps are executed. Otherwise, execution continues to Step 3. 3) The UI takes the segment group definition and runs it through the rules engine. If the precondition for a rule resolves to true, then the UI queues up the associated segment identifier as the next logical segment that should be played after the current segment is played. In a user-initiated branch decision: branching point video moments may be defined using a special choices array. Each entry in the choices array maps to specified metadata that will include either a segment group identifier or a segment identifier. If a segment identifier is provided, then the UI may take the user to that particular segment if the associated choice is selected. However, if a segment group identifier is provided, then the UI will look up the segment group from the segment group map/registry and execute the segment group via the rules engine to determine which segment to go to next.

In some cases, the rules engine may not have enough information to determine which logic segment should be played next. In some cases, this may occur because the system is waiting on user input. However, in such cases, the system may have enough information to narrow down the possible set of next logical segments. This may be helpful for video playback since it helps optimize the content-prefetching logic for the video. Indeed, the system may make on-the-fly modifications to branch weights based on which are more or less likely to be taken by the user. Those more likely to be selected may have their associated branch weights increased, and those less likely to be selected may have their associated branch weights decreased. Those branches having higher weights may be prefetched for faster provisioning to the client device.

At least in some embodiments, this logic is only performed for the current segment that the user is in (i.e., the segment that the user is currently viewing). However, in some cases, the system may begin to execute this logic to determine which future branches are most likely to be selected even before the user is viewing those segments. Since each possible playback action and user action are, at least in some cases, translated into custom state, the system may handle one of two cases: 1) when the system starts playback of a new segment, and 2) when there is a change in custom state. For both cases, the system may perform the following steps: 1) check for the branching point video moments that have been defined for the current segment, and, for each one, check each possible branching choice to see if: a) the choice is eligible to be shown, and b) the target segment should be associated with the choice, and 2) aggregate the target segments based on the rule executions from step 1 and use the aggregated information to update the weights for the next segments. For example, if a next segment is no longer eligible to be played at all, then reduce the weight of that segment to zero. Other modifications may also be made to optimize the branch weights so that data may be prefetched for certain branches having a minimum weight. This prefetching may ensure a steady data stream to the user, even if the video or other media item includes multiple branching points.

In some embodiments, as noted above, the content player 418 of FIG. 4 may allow users to playback the pre-rendered media item 409 in a non-sequential manner. The playback may begin automatically upon being streamed or downloaded to the content player 418. Alternatively, the pre-rendered media item 409 may be played back upon the computer system 401 indicating that the branching logic 416 has been properly applied. Once playback has been initialized, the content player (which may be part of computer system 401 or may be controlled by computer system 401) may receive user input 419 that directs playback order of the pre-rendered multimedia item. In some embodiments, the determination of where to initialize playback within the multimedia item may be based on historical user state. For instance, if the user has previously interacted with the multimedia item, playback may be initialized at a different location other than the beginning. The playback order may be sequential or non-sequential and may change throughout the viewing. As the viewer 420 provides certain inputs 419, the playback order of different logical segments may occur in order or out of order with respect to the order in which the logical segments were rendered prior to distribution. Thus, playback may skip between logic sections according to the branching logic (e.g., as shown in FIG. 10).

In some cases, when the viewer 420 makes a selection, the branching path changes occur immediately, and the user is taken to a chosen branch path. In other cases, the alterations to the pre-rendered multimedia item are performed at a later point during playback of the pre-rendered multimedia item. For instance, the viewer 420 may provide an input 419 at a branching point that may affect future branching points, or may have no apparent effect as the playback may continue to occur sequentially. For example, the viewer's input may select a specific item that the user is to pick up. This item may be an article of clothing for an avatar associated with the viewer. As the movie or tv show progresses, the viewer may find (or may be drawn to) other articles of clothing such as hats, shoes, shirts, pants, etc. These may be picked up throughout the course of the media content and may be displayed at certain points. These inputs may not affect playback of the media item, but may affect the viewer's avatar or other items associated with the viewer. These inputs may be stored in custom state associated with the viewer and with that viewer's particular playback session. It will be recognized that clothing and avatars are just some examples of many different items that may be collected or displayed during a playback session and that many other variations are possible.

In some embodiments, the pre-rendered multimedia item may be played back on a specified type of device or on a specified user interface. In some cases, the user interface may be a UI that is designed to play branching narrative media. In other cases, the UI may be a standard UI designed to play back a variety of different media types. In such cases, the pre-rendered multimedia item may be played back on the UI without having to alter the UI to allow branching narrative playback. As such, the branching narrative media may be played on a variety of older and legacy user interfaces. The branching logic that is part of or that is appended to the pre-rendered multimedia item (e.g., 409) may be interpreted by a rules engine that applies branching logic to the multimedia item. In some cases, the same rules engine may be configured to interpret branching logic from multiple different pre-rendered multimedia items, thus allowing compatibility among a variety of different playback devices.

While playing back the pre-rendered multimedia item 409, the computer system 401 or the content player 418 or the data store 410 may store a portion of custom state data for one or more of the branching points during the movie or tv show. The custom state data may include branching point decisions from a current branch point or from previous branching points. As noted above, the custom state data may also include various primitives or complex objects, where each primitive or complex object may have an associated portion of logic that is interpreted and applied by the rules engine. In other cases, the primitives and complex objects may be part of the branching logic and may be stored separately from the custom state data.

Content managers may design branching points and custom state for substantially any type of multimedia content. The content managers may use any number of primitives or complex objects when designing the branching points or custom state. Using the editing interface 415 (or, for example, interface 800 of FIG. 8), a content manager may visually create, move, edit, or otherwise interact with the branching points and/or associated state data. In some cases, the media segments and branching points may be arranged chronologically from start to finish, with branching points (e.g., 802-804) aligning with media segments (e.g., time-based or scene-based logical segments). Once a branching point has been created, the editing interface 800 may allow a user to select and move branching points to other locations. Similarly, the editing interface may allow users to select and change custom state data, as well as move it to different locations in the media item's timeline. As such, the editing interface may allow the user to visually track stored state data using different types of data structures displayed on the editing interface. In some cases, different types of branching points may be depicted using different colors or different line types or line weights. Similarly, different types of custom state data may be depicted using different methods so that the user can easily see where the various types of state are located. Using such an interface, a content manager or other user may select media that is to be associated with branching points or state data, and then create the branching points and state data, after which the rules engine will interpret and apply such to the media item.

In some embodiments, the computer system 401 may determine that a given branching point or piece of custom state only affects a certain logical segment, and does not affect other downstream segments. In such cases, when a viewer makes a selection at that branching point, the computer system 401 (or the content player 418) may determine that the viewer's selection has no further downstream playback effects, and may avoid storing state for that branching point. Thus, the execution of branching points and the updating of state may be performed in a smart manner, avoiding branch executions or avoiding the updating of state data if no branching points or other items downstream will be affected. Moreover, when the viewer selects certain paths, and other paths are no longer available, the available choices may be filtered down to a smaller pool of available options. Prefetching, prebuffering, or other streaming enhancements may then be applied to the smaller pool of media segments that are still available for selection by the viewer. When the state data is updated and saved, the state data may be saved at a playback location that is the same as or near (e.g., within 1-5 seconds) the associated branching point. In other cases, state data may be stored at a playback location that is different than at a branching point. As the viewer watches the movie or tv show, an accumulation of their selections may be stored in one or more state snapshots. If the user stops playback and resumes it at another time, the subsequent playback session will restore the user's selections from the stored state snapshot and begin playing back the branching narrative media item as if the playback had never stopped.

In addition to the method described above, a corresponding system may include at least one physical processor and physical memory comprising computer-executable instructions that, when executed by the physical processor, cause the physical processor to access a pre-rendered multimedia item and provide an editing interface that allows a content manager to specify branching logic for the pre-rendered multimedia item, where the branching logic designates how viewer interactions influence non-sequential playback of the pre-rendered multimedia item. The physical processor also receives input from the content manager specifying branching points in the pre-rendered multimedia item for which associated state data is to be generated, where each branching point is a point in the pre-rendered multimedia item at which the specified branching logic is to be applied. The physical processor also applies the specified branching logic to the pre-rendered multimedia item according to the received input from the content manager.

In some examples, the above-described method may be encoded as computer-readable instructions on a computer-readable medium. For example, a computer-readable medium may include one or more computer-executable instructions that, when executed by at least one processor of a computing device, may cause the computing device to access a pre-rendered multimedia item and provide an editing interface that allows a content manager to specify branching logic for the pre-rendered multimedia item, where the branching logic designates how viewer interactions influence non-sequential playback of the pre-rendered multimedia item. The computing device also receives input from the content manager specifying branching points in the pre-rendered multimedia item for which associated state data is to be generated, where each branching point is a point in the pre-rendered multimedia item at which the specified branching logic is to be applied. The computing device also applies the specified branching logic to the pre-rendered multimedia item according to the received input from the content manager.

Accordingly, in this manner, systems and methods may be provided that generate an editing interface that allows content managers to specify branching logic for pre-rendered multimedia items and then allows those pre-rendered multimedia items to be played back in a non-sequential manner according to the branching logic. The embodiments described herein further allow the viewer's state to be saved. As such, the viewer may stop playback and resume it at a later time, having all prior selections intact. This allows viewers to interact with branching narrative videos in a personalized manner that still functions like a normal streaming or downloaded video.

EXAMPLE EMBODIMENTS

1. A computer-implemented method comprising: accessing a pre-rendered multimedia item, the pre-rendered multimedia item having branching logic associated therewith, the branching logic including one or more branching points that direct non-sequential playback of the pre-rendered multimedia item, initializing playback of the pre-rendered multimedia item, accessing, at the one or more branching points, one or more trigger conditions that direct playback order of one or more segments of the pre-rendered multimedia item; updating, based on the trigger conditions, at least a portion of custom state data, and playing back the one or more segments of the pre-rendered multimedia item according to the trigger conditions.

2. The computer-implemented method of claim of claim 1, wherein the custom state data includes one or more primitives or complex objects, each primitive or complex object potentially having an associated portion of logic.

3. The computer-implemented method of claim 2, wherein at least one of the one or more operators or complex functions comprises a precondition definition that specifies a precondition that is to occur before at least one of the one or more branching points is triggered.

4. The computer-implemented method of claim 3, wherein the precondition is executed at runtime to determine whether a branching point selection associated with the precondition is to be displayed during playback.

5. The computer-implemented method of claim 1, wherein the branching logic is streamed in a data stream, along with the pre-rendered multimedia item, to a content player for playback to the user.

6. The computer-implemented method of claim 1, wherein at least one of the one or more trigger conditions comprises a user input received from a user.

7. The computer-implemented method of claim 6, wherein at least one of the one or more trigger conditions comprises a time-based trigger.

8. The computer-implemented method of claim 6, wherein at least one of the one or more trigger conditions is based on a state evaluation configured to evaluate a current condition of the custom state data.

9. The computer-implemented method of claim 1, wherein the custom state data is defined using one or more declarative statements.

10. The computer-implemented method of claim 9, wherein the one or more declarative statements are written using a domain specific language that is interpreted using a custom rules engine.

11. The computer-implemented method of claim 1, wherein the custom state data stores one or more branching point decisions from a current branch point or from previous branching points.

12. A system comprising: at least one physical processor; and physical memory comprising computer-executable instructions that, when executed by the physical processor, cause the physical processor to: access a pre-rendered multimedia item, the pre-rendered multimedia item having branching logic associated therewith, the branching logic including one or more branching points that direct non-sequential playback of the pre-rendered multimedia item, initialize playback of the pre-rendered multimedia item, access, at the one or more branching points, one or more trigger conditions that direct playback order of one or more segments of the pre-rendered multimedia item, update, based on the trigger conditions, at least a portion of custom state data, and play back the one or more segments of the pre-rendered multimedia item according to the trigger conditions.

13. The system of claim 12, wherein at least a portion of the custom state data is personalized to a specific user.

14. The system of claim 12, wherein the precondition is executed at runtime to determine whether a branching point selection associated with the precondition is to be displayed during playback.

15. The system of claim 12, wherein the specified branching logic for the accessed pre-rendered multimedia item is streamed to a client device along with the pre-rendered multimedia item.

16. The system of claim 12, wherein the branching logic is interpreted by a rules engine that applies branching logic to multiple different pre-rendered multimedia items.

17. The system of claim 12, further comprising storing at least a portion of state data at a playback location of the pre-rendered multimedia item that is different than at a branching point.

18. The system of claim 12, further comprising storing an accumulation of user selections in a state snapshot.

19. The system of claim 18, further comprising: resuming playback in a subsequent playback session of the pre-rendered multimedia item, and restoring the user's selections from the stored state snapshot.

20. A non-transitory computer-readable medium comprising one or more computer-executable instructions that, when executed by at least one processor of a computing device, cause the computing device to: access a pre-rendered multimedia item, the pre-rendered multimedia item having branching logic associated therewith, the branching logic including one or more branching points that direct non-sequential playback of the pre-rendered multimedia item, initialize playback of the pre-rendered multimedia item, access, at the one or more branching points, one or more trigger conditions that direct playback order of one or more segments of the pre-rendered multimedia item, update, based on the trigger conditions, at least a portion of custom state data, and play back the one or more segments of the pre-rendered multimedia item according to the trigger conditions.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to provide an editing interface, use the result of the transformation to apply branching logic to a pre-rendered multimedia item, and store the result of the transformation to play back the pre-rendered multimedia item according to the branching logic. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing a pre-rendered multimedia item that has branching logic associated therewith, the branching logic including one or more branching points that direct non-sequential playback of one or more logical segments of the pre-rendered multimedia item;
    initializing playback of a first logical segment of the pre-rendered multimedia item;
    determining that a subsequent logical segment of the pre-rendered multimedia item is to be played back;
    identifying, based on one or more logical segment weights associated with the logical segments, which logical segment is to be prefetched, the logical segment weights comprising numerical values that are assigned to each logical segment, the logical segment weights being dynamically updatable as playback of the pre-rendered multimedia item proceeds; and
    prefetching the identified logical segment according to the weighting.

2. The computer-implemented method of claim 1, further comprising:
    determining that a specific logical segment is more likely to be selected during playback; and
    increasing a weight value for the one or more logical segment weights associated with the specific logical segment.

3. The computer-implemented method of claim 1, further comprising:
    determining that a specific logical segment is less likely to be selected during playback; and
    decreasing a weight value for the one or more logical segment weights associated with the specific logical segment.

4. The computer-implemented method of claim 1, wherein the step of identifying which logical segment is to be prefetched is performed upon determining that at least a portion of custom state data associated with the logical segments has been updated.

5. The computer-implemented method of claim 4, further comprising playing back the one or more logical segments of the pre-rendered multimedia item according to the updated custom state data.

6. The computer-implemented method of claim 4, wherein the custom state data includes one or more primitives, complex objects, or functions.

7. The computer-implemented method of claim 6, wherein at least one of the one or more primitives, complex objects, or functions comprises a precondition definition that specifies a precondition that is to occur before at least one of the one or more branching points is triggered.

8. The computer-implemented method of claim 4, wherein the custom state data is defined using one or more declarative statements.

9. The computer-implemented method of claim 8, wherein the one or more declarative statements are written using a domain specific language that is interpreted using a custom rules engine.

10. The computer-implemented method of claim 4, wherein the custom state data stores one or more branching point decisions from a current branch point or from previous branching points.

11. The computer-implemented method of claim 1, further comprising:
  determining that a specific logical segment is no longer eligible to be selected during playback; and
  zeroing a weight value for the one or more logical segment weights associated with the specific logical segment.

12. The computer-implemented method of claim 1, wherein those logical segments are prefetched that have a minimum assigned logical segment weight.

13. A system comprising:
  at least one physical processor; and
  physical memory comprising computer-executable instructions that, when executed by the physical processor, cause the physical processor to:
  access a pre-rendered multimedia item that has branching logic associated therewith, the branching logic including one or more branching points that direct non-sequential playback of one or more logical segments of the pre-rendered multimedia item;
  initialize playback of a first logical segment of the pre-rendered multimedia item;
  determine that a subsequent logical segment of the pre-rendered multimedia item is to be played back;
  identify, based on one or more logical segment weights associated with the logical segments, which logical segment is to be prefetched, the logical segment weights comprising numerical values that are assigned to each logical segment, the logical segment weights being dynamically updatable as playback of the pre-rendered multimedia item proceeds; and
  prefetch the identified logical segment according to the weighting.

14. The system of claim 13, wherein the physical processor further modifies the one or more logical segment weights in substantially real time while the pre-rendered multimedia item is being played back.

15. The system of claim 13, wherein the branching logic is streamed in a data stream, along with the pre-rendered multimedia item, to a content player for playback.

16. The system of claim 13, wherein at least a portion of custom state data associated with the pre-rendered multimedia item is personalized to a specific user.

17. The system of claim 16, further comprising storing at least a portion of custom state data at a playback location of the pre-rendered multimedia item that is different than at a branching point.

18. The system of claim 13, further comprising storing an accumulation of user selections in a state snapshot.

19. The system of claim 18, further comprising:
  resuming playback in a subsequent playback session of the pre-rendered multimedia item; and
  restoring the user's selections from the state snapshot.

20. A non-transitory computer-readable medium comprising one or more computer-executable instructions that, when executed by at least one processor of a computing device, cause the computing device to:
  access a pre-rendered multimedia item that has branching logic associated therewith, the branching logic including one or more branching points that direct non-sequential playback of one or more logical segments of the pre-rendered multimedia item;
  initialize playback of a first logical segment of the pre-rendered multimedia item;
  determine that a subsequent logical segment of the pre-rendered multimedia item is to be played back;
  identify, based on one or more logical segment weights associated with the logical segments, which logical segment is to be prefetched, the logical segment weights comprising numerical values that are assigned to each logical segment, the logical segment weights being dynamically updatable as playback of the pre-rendered multimedia item proceeds; and
  prefetch the identified logical segment according to the weighting.

* * * * *